(12) United States Patent
Salsbury et al.

(10) Patent No.: US 10,907,846 B2
(45) Date of Patent: Feb. 2, 2021

(54) BUILDING CONTROL SYSTEM WITH COOPERATIVE EXTREMUM-SEEKING CONTROL

(71) Applicant: Johnson Controls Technology Company, Auburn Hills, MI (US)

(72) Inventors: Timothy I. Salsbury, Mequon, WI (US); John M. House, Saint-Leonard (CA)

(73) Assignee: Johnson Controls Technology Company, Auburn Hills, MI (US)

(*) Notice: Subject to any disclaimer, the term of this patent is extended or adjusted under 35 U.S.C. 154(b) by 0 days.

(21) Appl. No.: 16/052,120

(22) Filed: Aug. 1, 2018

(65) Prior Publication Data

US 2019/0041077 A1 Feb. 7, 2019

Related U.S. Application Data

(60) Provisional application No. 62/540,466, filed on Aug. 2, 2017.

(51) Int. Cl.
*F24F 11/30* (2018.01)
*F24F 11/70* (2018.01)
(Continued)

(52) U.S. Cl.
CPC .............. *F24F 11/30* (2018.01); *F24F 11/63* (2018.01); *F24F 11/70* (2018.01); *F24F 11/88* (2018.01);
(Continued)

(58) Field of Classification Search
CPC .. F24F 11/30; F24F 11/63; F24F 11/88; F24F 11/70; F24F 2140/40; F24F 2110/20;
(Continued)

(56) References Cited

U.S. PATENT DOCUMENTS 6,577,906 B1 * 6/2003 Hurtado ........... G05B 19/41865
700/19
7,580,775 B2 8/2009 Kulyk et al.
(Continued)

FOREIGN PATENT DOCUMENTS

CN 106028584 10/2016
CN 106991076 7/2017

OTHER PUBLICATIONS

Extended EP Search Report on European Application No. 18186760.7 dated Dec. 10, 2018. 9 pages.
(Continued)

*Primary Examiner* — Thomas C Lee
*Assistant Examiner* — Azuman Sharmin
(74) *Attorney, Agent, or Firm* — Foley & Lardner LLP

(57) ABSTRACT

A cooperative extremum-seeking control system includes a first controller and a second controller. The first controller is configured to provide a first control input to a first plant and receive a first performance variable as feedback from the first plant. The second controller is configured to provide a second control input to a second plant that interacts with the first plant, receive a second performance variable as feedback from the second plant, and provide the second performance variable to the first controller. The first controller is further configured to aggregate the first performance variable and the second performance variable to determine a total performance variable, calculate a gradient of the total performance variable with respect to the first control input, generate a third control input using the gradient of the total performance variable, and provide the third control input to the first plant.

20 Claims, 11 Drawing Sheets

(51) Int. Cl.
| | |
|---|---|
| F25B 49/02 | (2006.01) |
| G05B 5/01 | (2006.01) |
| G05B 13/02 | (2006.01) |
| G05D 23/19 | (2006.01) |
| F24F 11/63 | (2018.01) |
| F24F 11/88 | (2018.01) |
| F24F 110/00 | (2018.01) |
| F24F 140/40 | (2018.01) |
| F24F 11/00 | (2018.01) |
| F24F 140/60 | (2018.01) |
| F24F 110/10 | (2018.01) |
| F24F 110/40 | (2018.01) |
| F24F 110/20 | (2018.01) |

(52) U.S. Cl.
CPC ............ *F25B 49/02* (2013.01); *F25B 49/027* (2013.01); *G05B 5/01* (2013.01); *G05B 13/024* (2013.01); *G05B 13/0225* (2013.01); *G05D 23/1917* (2013.01); *F24F 11/0001* (2013.01); *F24F 2110/00* (2018.01); *F24F 2110/10* (2018.01); *F24F 2110/20* (2018.01); *F24F 2110/40* (2018.01); *F24F 2140/40* (2018.01); *F24F 2140/60* (2018.01); *F25B 2313/0233* (2013.01); *F25B 2313/0314* (2013.01); *F25B 2600/11* (2013.01); *F25B 2700/1931* (2013.01); *F25B 2700/1933* (2013.01); *F25B 2700/21163* (2013.01); *F25B 2700/21173* (2013.01); *G05B 2219/2614* (2013.01)

(58) Field of Classification Search
CPC ............... F24F 2140/60; F24F 2110/00; F24F 2110/40; F24F 2110/10; F24F 11/0001; F25B 49/02; F25B 49/027; F25B 2313/0233; F25B 2313/0314; F25B 2600/11; F25B 2700/1931; F25B 2700/1933; F25B 2700/21163; F25B 2700/21173; G05B 5/01; G05B 13/0225; G05B 13/024; G05B 2219/2614; G05D 23/1917

See application file for complete search history.

(56) References Cited

U.S. PATENT DOCUMENTS

| | | |
|---|---|---|
| 7,827,813 B2 | 11/2010 | Seem |
| 7,894,946 B2 | 2/2011 | Kulyk et al. |
| 8,027,742 B2 | 9/2011 | Seem et al. |
| 8,200,344 B2 | 6/2012 | Li et al. |
| 8,200,345 B2 | 6/2012 | Li et al. |
| 8,473,080 B2 | 6/2013 | Seem et al. |
| 8,527,108 B2 | 9/2013 | Kulyk et al. |
| 8,527,109 B2 | 9/2013 | Kulyk et al. |
| 8,918,223 B2 | 12/2014 | Kulyk et al. |
| 9,110,647 B2 | 8/2015 | Kulyk et al. |
| 9,703,339 B2 | 7/2017 | Kulyk et al. |
| 9,835,349 B2 | 12/2017 | Salsbury et al. |
| 10,139,877 B2 | 11/2018 | Kulyk et al. |
| 2013/0300115 A1* | 11/2013 | Seem ................ H02P 9/04 290/44 |
| 2014/0214214 A1* | 7/2014 | Asmus ............... G01D 3/021 700/276 |
| 2016/0098020 A1 | 4/2016 | Salsbury et al. |
| 2016/0131382 A1* | 5/2016 | Rosen ................ F24F 11/62 700/278 |
| 2016/0132027 A1* | 5/2016 | Li ..................... G05B 13/024 700/33 |
| 2017/0176954 A1 | 6/2017 | Salsbury et al. |

OTHER PUBLICATIONS

Menon Anup, et al, Collaborative Extremum Seeking for Welfare Optimization, 53rd IEEE Conference on Decision and Controle, IEEE, Dec. 15, 2014, pp. 346-351.

Mu Baojie et al, Optimization and Sequencing of Chilled-Waterplant Based on Extremum Seeking Control, 2016 American Control Conference (ACC); American Automatic Control Council (AACC), Jul. 6, 2016, pp. 2373-2378.

Office Action on CN201810869569.X dated Apr. 3, 2020, 23 pages with English language translation.

* cited by examiner

BUILDING CONTROL SYSTEM WITH COOPERATIVE EXTREMUM-SEEKING CONTROL

CROSS-REFERENCE TO RELATED PATENT APPLICATION

This application claims the benefit of and priority to U.S. Provisional Patent Application No. 62/540,466 filed Aug. 2, 2017, the entire disclosure of which is incorporated by reference herein.

BACKGROUND

The present disclosure relates generally to an extremum-seeking control (ESC) system. ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure. ESC is a non-model based control strategy, meaning that a model for the controlled system is not necessary for ESC to optimize the system. An ESC system may include one or more extremum-seeking controllers that operate on separate but interacting equipment.

SUMMARY

One implementation of the present disclosure is a cooperative extremum-seeking control system including a first extremum-seeking controller and a second extremum-seeking controller. The first controller is configured to provide a first control input to a first plant and receive a first performance variable as feedback from the first plant. The second controller is configured to provide a second control input to a second plant that interacts with the first plant, receive a second performance variable as feedback from the second plant, and provide the second performance variable to the first controller. The first controller is further configured to aggregate the first performance variable and the second performance variable to determine a total performance variable, calculate a gradient of the total performance variable with respect to the first control input, generate a third control input using the gradient of the total performance variable, and provide the third control input to the first plant. The first plant uses the third control input to operate equipment of the first plant, thereby affecting a variable state or condition of the first plant.

In some embodiments, the total performance variable indicates total power consumption of the first plant and the second plant.

In some embodiments, the third control input is a temperature setpoint, a pressure setpoint, a speed setpoint, a damper position, or a valve position.

In some embodiments, the first performance variable indicates power consumption, temperature, pressure, flow, humidity, air quality (e.g., concentration of volatile organic compounds, carbon dioxide, or other measurements), damper position, coefficient of performance (e.g., ratio of heating or cooling provided to work required to produce the heating or cooling), comfort (e.g., comfort of building occupants such as thermal comfort, airflows, visual comfort, acoustic comfort, etc.), or valve position.

In some embodiments, the first controller is further configured to drive the gradient of the total performance variable with respect to the first control input to zero in order to generate the third control input.

In some embodiments, the first plant is an air handling unit (AHU), a chilled water plant, a variable refrigerant flow (VRF) system, or a vapor compression system.

In some embodiments, the first controller is further configured to filter disturbances from the first performance variable.

Another implementation of the present disclosure is a cooperative extremum-seeking control method. The method includes providing a first control input to a first control system and receiving a first performance variable as feedback from the first control system. The method further includes receiving a second performance variable from a second control system that interacts with the first control system and aggregating the first performance variable and the second performance variable to determine a total performance variable. The method further includes calculating a gradient of the total performance variable with respect to the first control input, generating a second control input using the gradient of the total performance variable, and providing the second control input to the first control system. The method further includes using the second control input to operate equipment of the first control system, thereby affecting a variable state or condition of the first control system.

In some embodiments, the total performance variable indicates total power consumption of the first control system and the second control system.

In some embodiments, the second control input is a temperature setpoint, a pressure setpoint, a speed setpoint, or a valve position.

In some embodiments, the first performance variable indicates power consumption, temperature, pressure, flow, humidity, air quality (e.g., concentration of volatile organic compounds, carbon dioxide, or other measurements), damper position, coefficient of performance (e.g., ratio of heating or cooling provided to work required to produce the heating or cooling), comfort (e.g., comfort of building occupants such as thermal comfort, airflows, visual comfort, acoustic comfort, etc.), or valve position.

In some embodiments, generating the second control input using the gradient of the total performance variable comprises driving the gradient of the total performance variable with respect to the first control input to zero.

In some embodiments, the first control system is an air handling unit (AHU), a chilled water plant, a variable refrigerant flow (VRF) system, or a vapor compression system.

In some embodiments, the method further includes filtering disturbances from the first performance variable.

Yet another implementation of the present disclosure is an extremum-seeking controller. The controller is configured to provide a first control input to a first control system and receive a first performance variable as feedback from the first control system. The controller is further configured to receive a second performance variable from a second control system that interacts with the first control system and aggregate the first performance variable and the second performance variable to determine a total performance variable. The controller is further configured to calculate a gradient of the total performance variable with respect to the first control input, generate a second control input using the gradient of the total performance variable, and provide the second control input to the first control system. The first control system uses the second control input to operate equipment of the first control system, thereby affecting a variable state or condition of the first control system.

In some embodiments, the total performance variable indicates total power consumption of the first control system and the second control system.

In some embodiments, the second control input is a temperature setpoint, a pressure setpoint, a speed setpoint, or a valve position.

In some embodiments, the first performance variable indicates power consumption, temperature, pressure, flow, humidity, air quality (e.g., concentration of volatile organic compounds, carbon dioxide, etc.), damper position, coefficient of performance (e.g., ratio of heating or cooling provided to work required to produce the heating or cooling), comfort (e.g., comfort of building occupants such as thermal comfort, airflows, visual comfort, acoustic comfort, etc.), or valve position.

In some embodiments, the controller is further configured to drive the gradient of the total performance variable with respect to the first control input to zero in order to generate the second control input.

In some embodiments, the first control system is an air handling unit (AHU), a chilled water plant, a variable refrigerant flow (VRF) system, or a vapor compression system.

Those skilled in the art will appreciate this summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, various extremum-seeking control (ESC) systems and methods are shown, according to some embodiments. In general, ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure.

Optimization of system performance can be obtained by driving the gradient towards zero by using a feedback loop in the closed-loop system. ESC is a non-model based control strategy, meaning that a model for the controlled system is not necessary for ESC to optimize the system. Various implementations of ESC are described in detail in U.S. Pat. Nos. 8,473,080, 7,827,813, U.S. Pat. Nos. 8,027,742, 8,200,345, U.S. Pat. Nos. 8,200,344, 9,835,349, U.S. patent application Ser. No. 14/538,700, U.S. patent application Ser. No. 14/975,527, and U.S. patent application Ser. No. 14/961,747. Each of these patents and patent applications is incorporated by reference herein.

In some embodiments, an extremum-seeking control system consists of two or more extremum-seeking controllers operating on separate but interacting equipment. All of the controllers in the system can be connected in a peer-to-peer manner in order to share performance variable data. The controllers can then be configured to calculate a total performance variable based on this data in order to find a global optimal solution for the ESC system. Additional features and advantages of a cooperative extremum-seeking control system are described in greater detail below.

Building and HVAC System

Figure 1:
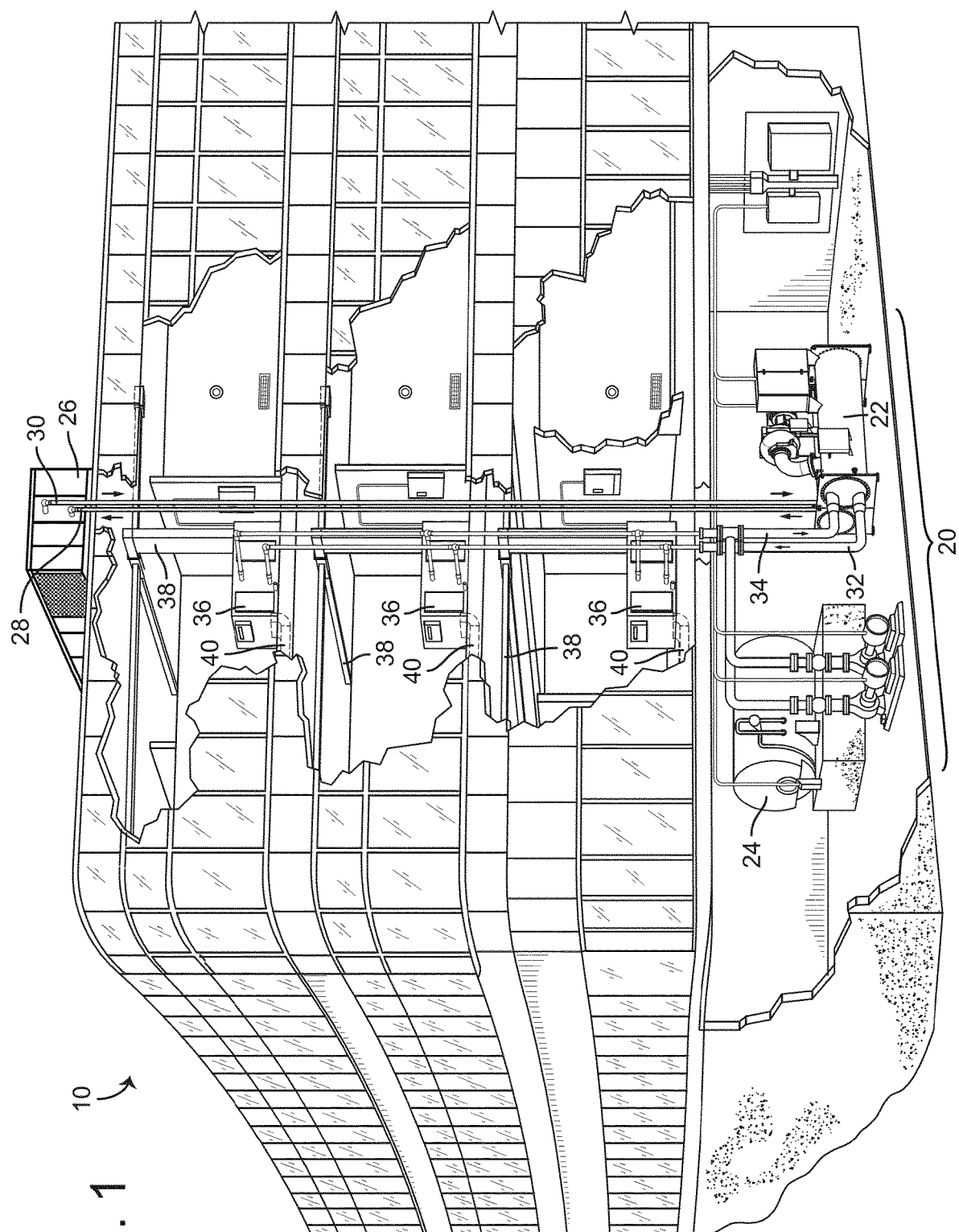
FIG. 1 is a drawing of a building in which an extremum-seeking control system can be implemented, according to some embodiments.
Figure 2:
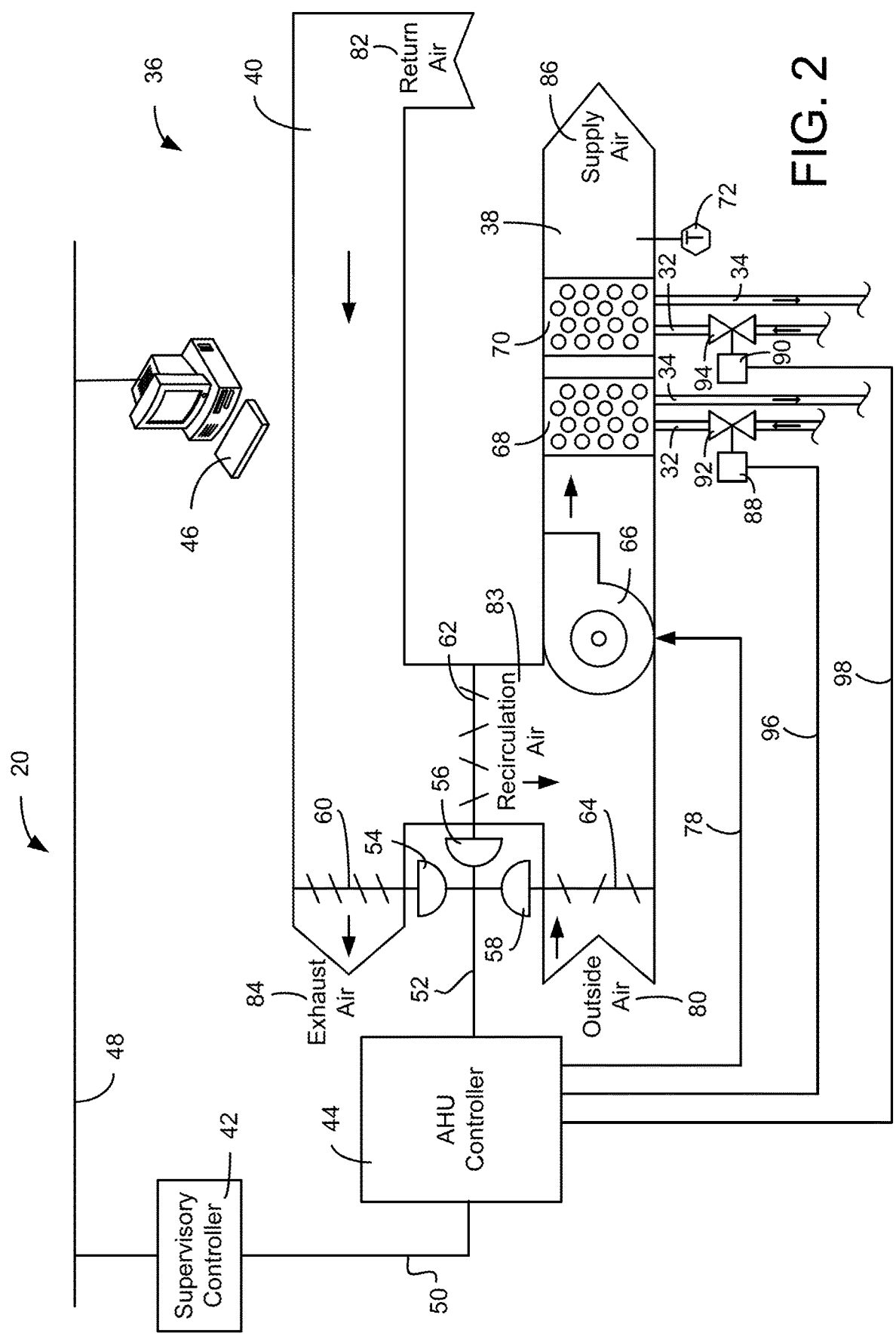
FIG. 2 is a block diagram of a building HVAC system in which an extremum-seeking control system can be implemented, according to some embodiments.

Referring now to FIGS. 1-2, a building 10 and HVAC system 20 in which an extremum-seeking control system can be implemented are shown, according to some embodiments. Although the ESC systems and methods of the present disclosure are described primarily in the context of a building HVAC system, it should be understood that ESC is generally applicable to any type of control system that optimizes or regulates a variable of interest. For example, the ESC systems and methods of the present disclosure can be used to optimize an amount of energy produced by various types of energy-producing systems or devices (e.g., power plants, steam or wind turbines, solar panels, combustion systems, etc.) and/or to optimize an amount of energy consumed by various types of energy consuming systems or devices (e.g., electronic circuitry, mechanical equipment, aerospace and land-based vehicles, building equipment, HVAC devices, refrigeration systems, etc.).

In various implementations, ESC can be used in any type of controller that functions to achieve a setpoint for a variable of interest (e.g., by minimizing a difference between a measured or calculated input and a setpoint) and/or optimize a variable of interest (e.g., maximize or minimize an output variable). It is contemplated that ESC can be readily implemented in various types of controllers (e.g., motor controllers, power controllers, fluid controllers, HVAC controllers, lighting controllers, chemical controllers, process controllers, etc.) and various types of control systems (e.g., closed-loop control systems, open-loop control systems, feedback control systems, feed-forward control systems, etc.). All such implementations should be considered within the scope of the present disclosure.

Referring particularly to FIG. 1, a perspective view of building 10 is shown. Building 10 is served by HVAC system 20. HVAC system 20 is shown to include a chiller 22, a boiler 24, a rooftop cooling unit 26, and a plurality of air-handling units (AHUs) 36. HVAC system 20 uses a fluid circulation system to provide heating and/or cooling for building 10. The circulated fluid can be cooled in chiller 22 or heated in boiler 24, depending on whether cooling or heating is required. Boiler 24 may add heat to the circulated fluid by burning a combustible material (e.g., natural gas). Chiller 22 may place the circulated fluid in a heat exchange relationship with another fluid (e.g., a refrigerant) in a heat exchanger (e.g., an evaporator). The refrigerant removes heat from the circulated fluid during an evaporation process, thereby cooling the circulated fluid.

The circulated fluid from chiller 22 or boiler 24 can be transported to AHUs 36 via piping 32. AHUs 36 may place the circulated fluid in a heat exchange relationship with an airflow passing through AHUs 36. For example, the airflow can be passed over piping in fan coil units or other air conditioning terminal units through which the circulated fluid flows. AHUs 36 may transfer heat between the airflow and the circulated fluid to provide heating or cooling for the airflow. The heated or cooled air can be delivered to building 10 via an air distribution system including air supply ducts 38 and may return to AHUs 36 via air return ducts 40. In FIG. 1, HVAC system 20 is shown to include a separate AHU 36 on each floor of building 10. In other embodiments, a single AHU (e.g., a rooftop AHU) may supply air for multiple floors or zones. The circulated fluid from AHUs 36 may return to chiller 22 or boiler 24 via piping 34.

In some embodiments, the refrigerant in chiller 22 is vaporized upon absorbing heat from the circulated fluid. The vapor refrigerant can be provided to a compressor within chiller 22 where the temperature and pressure of the refrigerant are increased (e.g., using a rotating impeller, a screw compressor, a scroll compressor, a reciprocating compressor, a centrifugal compressor, etc.). The compressed refrigerant can be discharged into a condenser within chiller 22. In some embodiments, water (or another chilled fluid) flows through tubes in the condenser of chiller 22 to absorb heat from the refrigerant vapor, thereby causing the refrigerant to condense. The water flowing through tubes in the condenser can be pumped from chiller 22 to a rooftop cooling unit 26 via piping 28. Cooling unit 26 may use fan driven cooling or fan driven evaporation to remove heat from the water. The cooled water in rooftop unit 26 can be delivered back to chiller 22 via piping 30 and the cycle repeats.

Referring now to FIG. 2, a block diagram illustrating a portion of HVAC system 20 in greater detail is shown, according to some embodiments. In FIG. 2, AHU 36 is shown as an economizer type air handling unit. Economizer type air handling units vary the amount of outside air and return air used by the air handling unit for heating or cooling. For example, AHU 36 may receive return air 82 from building 10 via return air duct 40 and may deliver supply air 86 to building 10 via supply air duct 38. AHU 36 can be configured to operate exhaust air damper 60, mixing damper 62, and outside air damper 64 to control an amount of outside air 80 and return air 82 that combine to form supply air 86. Any return air 82 that does not pass through mixing damper 62 can be exhausted from AHU 36 through exhaust damper 60 as exhaust air 84.

Each of dampers 60-64 can be operated by an actuator. As shown in FIG. 2, exhaust air damper 60 is operated by actuator 54, mixing damper 62 is operated by actuator 56, and outside air damper 64 is operated by actuator 58. Actuators 54-58 may communicate with an AHU controller 44 via a communications link 52. AHU controller 44 can be an economizer controller configured to use one or more control algorithms (e.g., state-based algorithms, ESC algorithms, PID control algorithms, model predictive control algorithms, etc.) to control actuators 54-58. Examples of ESC methods that can be used by AHU controller 44 are described in greater detail with reference to FIGS. 8-9.

Actuators 54-58 may receive control signals from AHU controller 44 and may provide feedback signals to AHU controller 44. Feedback signals may include, for example, an indication of a current actuator or damper position, an amount of torque or force exerted by the actuator, diagnostic information (e.g., results of diagnostic tests performed by actuators 54-58), status information, commissioning information, configuration settings, calibration data, and/or other types of information or data that can be collected, stored, or used by actuators 54-58.

Still referring to FIG. 2, AHU 36 is shown to include a cooling coil 68, a heating coil 70, and a fan 66. In some embodiments, cooling coil 68, heating coil 70, and fan 66 are positioned within supply air duct 38. Fan 66 can be configured to force supply air 86 through cooling coil 68 and/or heating coil 70. AHU controller 44 may communicate with fan 66 via communications link 78 to control a flow rate of supply air 86. Cooling coil 68 may receive a chilled fluid from chiller 22 via piping 32 and may return the chilled fluid to chiller 22 via piping 34. Valve 92 can be positioned along piping 32 or piping 34 to control an amount of the chilled fluid provided to cooling coil 68. Heating coil 70 may receive a heated fluid from boiler 24 via piping 32 and may return the heated fluid to boiler 24 via piping 34. Valve 94 can be positioned along piping 32 or piping 34 to control an amount of the heated fluid provided to heating coil 70.

Each of valves 92-94 can be controlled by an actuator. As shown in FIG. 2, valve 92 is controlled by actuator 88 and valve 94 is controlled by actuator 90. Actuators 88-90 may communicate with AHU controller 44 via communications links 96-98. Actuators 88-90 may receive control signals from AHU controller 44 and may provide feedback signals to controller 44. In some embodiments, AHU controller 44 receives a measurement of the supply air temperature from a temperature sensor 72 positioned in supply air duct 38 (e.g., downstream of cooling coil 68 and heating coil 70). However, temperature sensor 72 is not required and may not be included in some embodiments.

AHU controller 44 may operate valves 92-94 via actuators 88-90 to modulate an amount of heating or cooling provided to supply air 86 (e.g., to achieve a setpoint temperature for supply air 86 or to maintain the temperature of supply air 86 within a setpoint temperature range). The positions of valves 92-94 affect the amount of cooling or heating provided to supply air 86 by cooling coil 68 or heating coil 70 and may correlate with the amount of energy consumed to achieve a desired supply air temperature. In various embodiments, valves 92-94 can be operated by AHU controller 44 or a separate controller for HVAC system 20.

AHU controller 44 may monitor the positions of valves 92-94 via communications links 96-98. AHU controller 44 may use the positions of valves 92-94 as the variable to be optimized using an ESC control technique. AHU controller 44 may determine and/or set the positions of dampers 60-64 to achieve an optimal or target position for valves 92-94. The optimal or target position for valves 92-94 can be the position that corresponds to the minimum amount of mechanical heating or cooling used by HVAC system 20 to achieve a setpoint supply air temperature (e.g., minimum fluid flow through valves 92-94).

Still referring to FIG. 2, HVAC system 20 is shown to include a supervisory controller 42 and a client device 46. Supervisory controller 42 may include one or more computer systems (e.g., servers, BAS controllers, etc.) that serve as enterprise level controllers, application or data servers, head nodes, master controllers, or field controllers for HVAC system 20. Supervisory controller 42 may communicate with multiple downstream building systems or subsystems (e.g., an HVAC system, a security system, etc.) via a communications link 50 according to like or disparate protocols (e.g., LON, BACnet, etc.).

In some embodiments, AHU controller 44 receives information (e.g., commands, setpoints, operating boundaries, etc.) from supervisory controller 42. For example, supervisory controller 42 may provide AHU controller 44 with a high fan speed limit and a low fan speed limit. A low limit may avoid frequent component and power taxing fan start-ups while a high limit may avoid operation near the mechanical or thermal limits of the fan system. In various embodiments, AHU controller 44 and supervisory controller 42 can be separate (as shown in FIG. 2) or integrated. In an integrated implementation, AHU controller 44 can be a software module configured for execution by a processor of supervisory controller 42.

Client device 46 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, its subsystems, and/or devices. Client device 46 can be a computer workstation, a client terminal, a remote or local interface, or any other type of user interface device. Client device 46 can be a stationary terminal or a mobile device. For example, client device 46 can be a desktop computer, a computer server with a user interface, a laptop computer, a tablet, a smartphone, a PDA, or any other type of mobile or non-mobile device.

Extremum-Seeking Control Systems

Figure 3:
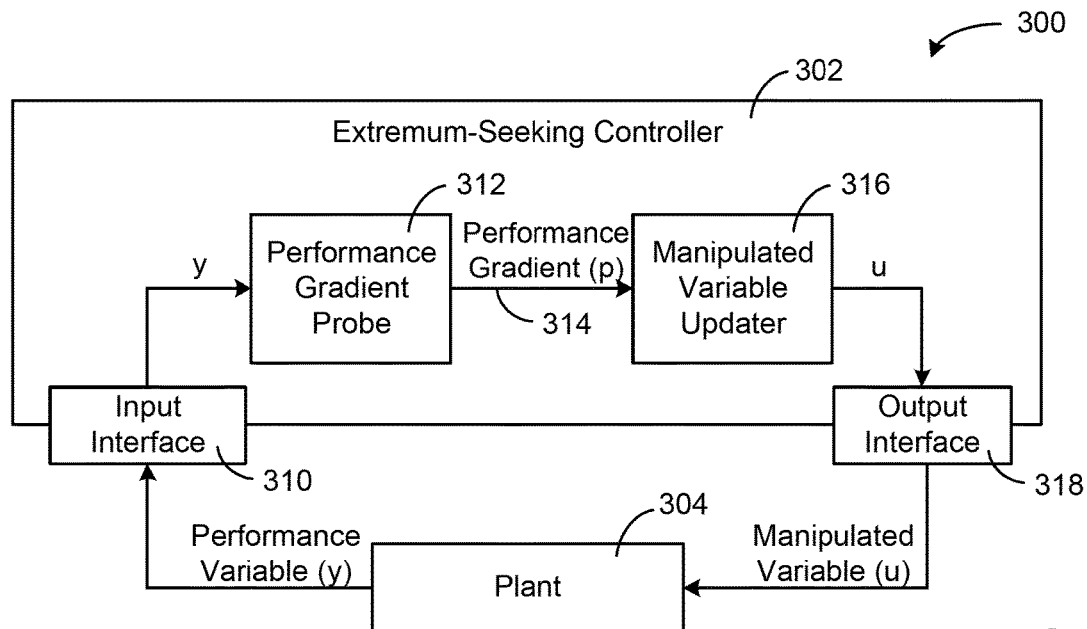
FIG. 3 is a block diagram of an extremum-seeking control system which uses a dither signal to perturb a control input provided to a plant, according to some embodiments.

Referring now to FIG. 3, a block diagram of an extremum-seeking control (ESC) system 300 with a periodic dither signal is shown, according to some embodiments. ESC system 300 is shown to include an extremum-seeking controller 302 and a plant 304. A plant in control theory is the combination of a process and one or more mechanically-controlled outputs. For example, plant 304 can be an air handling unit configured to control temperature within a building space via one or more mechanically-controlled actuators and/or dampers. In various embodiments, plant 304 can include a chiller operation process, a damper adjustment process, a mechanical cooling process, a ventilation process, a refrigeration process, or any other process in which an input variable to plant 304 (i.e., manipulated variable u) is adjusted to affect an output from plant 304 (i.e., performance variable y).

Extremum-seeking controller 302 uses extremum-seeking control logic to modulate the manipulated variable u. For example, controller 302 may use a periodic (e.g., sinusoidal) perturbation signal or dither signal to perturb the value of manipulated variable u in order to extract a performance gradient p. The manipulated variable u can be perturbed by adding periodic oscillations to a DC value of the performance variable u, which may be determined by a feedback control loop. The performance gradient p represents the gradient or slope of the performance variable y with respect to the manipulated variable u. Controller 302 uses extremum-seeking control logic to determine a value for the manipulated variable u that drives the performance gradient p to zero.

Controller 302 may determine the DC value of manipulated variable u based on a measurement or other indication of the performance variable y received as feedback from plant 304 via input interface 310. Measurements from plant 304 can include, but are not limited to, information received from sensors about the state of plant 304 or control signals sent to other devices in the system. In some embodiments, the performance variable y is a measured or observed position of one of valves 92-94. In other embodiments, the performance variable y is a measured or calculated amount of power consumption, a fan speed, a damper position, a temperature, or any other variable that can be measured or calculated by plant 304. Performance variable y can be the variable that extremum-seeking controller 302 seeks to optimize via an extremum-seeking control technique. Performance variable y can be output by plant 304 or observed at plant 304 (e.g., via a sensor) and provided to extremum-seeking controller at input interface 310.

Input interface 310 provides the performance variable y to performance gradient probe 312 to detect the performance gradient 314. Performance gradient 314 may indicate a slope of the function $y=f(u)$, where y represents the performance variable received from plant 304 and u represents the manipulated variable provided to plant 304. When performance gradient 314 is zero, the performance variable y has an extremum value (e.g., a maximum or minimum). Therefore, extremum-seeking controller 302 can optimize the value of the performance variable y by driving performance gradient 314 to zero.

Manipulated variable updater 316 produces an updated manipulated variable u based upon performance gradient 314. In some embodiments, manipulated variable updater 316 includes an integrator to drive performance gradient 314 to zero. Manipulated variable updater 316 then provides an updated manipulated variable u to plant 304 via output interface 318. In some embodiments, manipulated variable u is provided to one of dampers 60-64 (FIG. 2) or an actuator affecting dampers 60-64 as a control signal via output interface 318. Plant 304 can use manipulated variable u as a setpoint to adjust the position of dampers 60-64 and thereby control the relative proportions of outdoor air 80 and recirculation air 83 provided to a temperature-controlled space.

Figure 4:
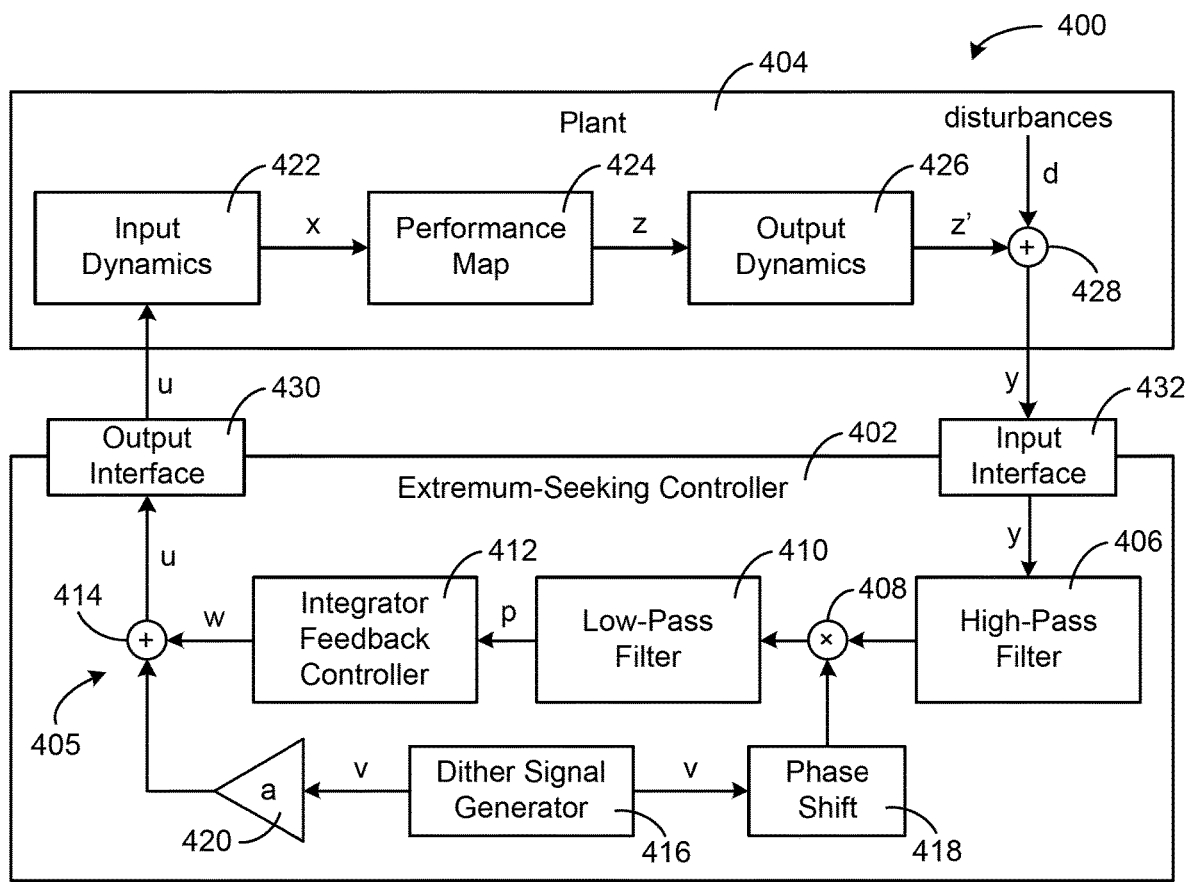
FIG. 4 is a block diagram of another extremum-seeking control system which uses a dither signal to perturb a control input provided to a plant, according to some embodiments.

Referring now to FIG. 4, a block diagram of another ESC system 400 with a periodic dither signal is shown, according to some embodiments. ESC system 400 is shown to include a plant 404 and an extremum-seeking controller 402. Controller 402 uses an extremum-seeking control strategy to optimize a performance variable y received as an output from plant 404. Optimizing performance variable y can include minimizing y, maximizing y, controlling y to achieve a setpoint, or otherwise regulating the value of performance variable y.

Plant 404 can be the same as plant 304 or similar to plant 304, as described with reference to FIG. 3. For example, plant 404 can be a combination of a process and one or more mechanically-controlled outputs. In some embodiments, plant 404 is an air handling unit configured to control temperature within a building space via one or more mechanically-controlled actuators and/or dampers. In other embodiments, plant 404 can include a chiller operation process, a damper adjustment process, a mechanical cooling process, a ventilation process, or any other process that generates an output based on one or more control inputs.

Plant 404 can be represented mathematically as a combination of input dynamics 422, a performance map 424, output dynamics 426, and disturbances d. In some embodiments, input dynamics 422 are linear time-invariant (LTI) input dynamics and output dynamics 426 are LTI output dynamics. Performance map 424 can be a static nonlinear performance map. Disturbances d can include process noise, measurement noise, or a combination of both. Although the components of plant 404 are shown in FIG. 4, it should be noted that the actual mathematical model for plant 404 does not need to be known in order to apply ESC.

Plant 404 receives a control input u (e.g., a control signal, a manipulated variable, etc.) from extremum-seeking controller 402 via output interface 430. Input dynamics 422 may use the control input u to generate a function signal x based on the control input (e.g., $x=f(u)$). Function signal x may be passed to performance map 424 which generates an output signal z as a function of the function signal (i.e., $z=f(x)$). The output signal z may be passed through output dynamics 426 to produce signal z', which is modified by disturbances d to produce performance variable y (e.g., $y=z'+d$). Performance variable y is provided as an output from plant 404 and received at extremum-seeking controller 402. Extremum-seeking controller 402 may seek to find values for x and/or u that optimize the output z of performance map 424 and/or the performance variable y.

Still referring to FIG. 4, extremum-seeking controller 402 is shown receiving performance variable y via input interface 432 and providing performance variable y to a control loop 405 within controller 402. Control loop 405 is shown to include a high-pass filter 406, a demodulation element 408, a low-pass filter 410, an integrator feedback controller 412, and a dither signal element 414. Control loop 405 may be configured to extract a performance gradient p from performance variable y using a dither-demodulation technique. Integrator feedback controller 412 analyzes the performance gradient p and adjusts the DC value of the plant input (i.e., the variable w) to drive performance gradient p to zero.

The first step of the dither-demodulation technique is performed by dither signal generator 416 and dither signal element 414. Dither signal generator 416 generates a periodic dither signal v, which is typically a sinusoidal signal. Dither signal element 414 receives the dither signal v from dither signal generator 416 and the DC value of the plant input w from controller 412. Dither signal element 414 combines dither signal v with the DC value of the plant input w to generate the perturbed control input u provided to plant 404 (e.g., $u=w+v$). The perturbed control input u is provided to plant 404 and used by plant 404 to generate performance variable y as previously described.

The second step of the dither-demodulation technique is performed by high-pass filter 406, demodulation element 408, and low-pass filter 410. High-pass filter 406 filters the performance variable y and provides the filtered output to demodulation element 408. Demodulation element 408 demodulates the output of high-pass filter 406 by multiplying the filtered output by the dither signal v with a phase shift 418 applied. The DC value of this multiplication is proportional to the performance gradient p of performance variable y with respect to the control input u. The output of demodulation element 408 is provided to low-pass filter 410, which extracts the performance gradient p (i.e., the DC value of the demodulated output). The estimate of the performance gradient p is then provided to integrator feedback controller 412, which drives the performance gradient estimate p to zero by adjusting the DC value w of the plant input u.

Still referring to FIG. 4, extremum-seeking controller 402 is shown to include an amplifier 420. It may be desirable to amplify the dither signal v such that the amplitude of the dither signal v is large enough for the effects of dither signal v to be evident in the plant output y. The large amplitude of dither signal v can result in large variations in the control input u, even when the DC value w of the control input u remains constant. Graphs illustrating a control input u and a performance variable y with periodic oscillations caused by a periodic dither signal v are shown in FIGS. 6A-6B (described in greater detail below). Due to the periodic nature of the dither signal v, the large variations in the plant input u (i.e., the oscillations caused by the dither signal v) are often noticeable to plant operators.

Additionally, it may be desirable to carefully select the frequency of the dither signal v to ensure that the ESC strategy is effective. For example, it may be desirable to select a dither signal frequency $\omega_v$ based on the natural frequency $\omega_n$ of plant 304 to enhance the effect of the dither signal v on the performance variable y. It can be difficult and challenging to properly select the dither frequency $\omega_v$ without knowledge of the dynamics of plant 404. For these reasons, the use of a periodic dither signal v is one of the drawbacks of traditional ESC.

In ESC system 400, the output of high-pass filter 406 can be represented as the difference between the value of the performance variable y and the expected value of the performance variable y, as shown in the following equation:

Output of High-Pass Filter: $y-E[y]$ where the variable $E[y]$ is the expected value of the performance variable y. The result of the cross-correlation performed by demodulation element 408 (i.e., the output of demodulation element 408) can be represented as the product of the high-pass filter output and the phase-shifted dither signal, as shown in the following equation:

Result of Cross-Correlation: $(y-E[y])(v-E[v])$ where the variable $E[v]$ is the expected value of the dither signal v. The output of low-pass filter 410 can be represented as the covariance of the dither signal v and the performance variable y, as shown in the following equation:

Output of Low-Pass Filter: $E[(y-E[y])(v-E[u])]=\text{Cov}(v, y)$ where the variable $E[u]$ is the expected value of the control input u.

The preceding equations show that ESC system 400 generates an estimate for the covariance $\text{Cov}(v, y)$ between the dither signal v and the plant output (i.e., the performance variable y). The covariance $\text{Cov}(v, y)$ can be used in ESC system 400 as a proxy for the performance gradient p. For example, the covariance Cov(v, y) can be calculated by high-pass filter 406, demodulation element 408, and low-pass filter 410 and provided as a feedback input to integrator feedback controller 412. Integrator feedback controller 412 can adjust the DC value w of the plant input u in order to minimize the covariance Cov(v, y) as part of the feedback control loop.

ESC System With Centralized Performance Variable Aggregator

Figure 5:
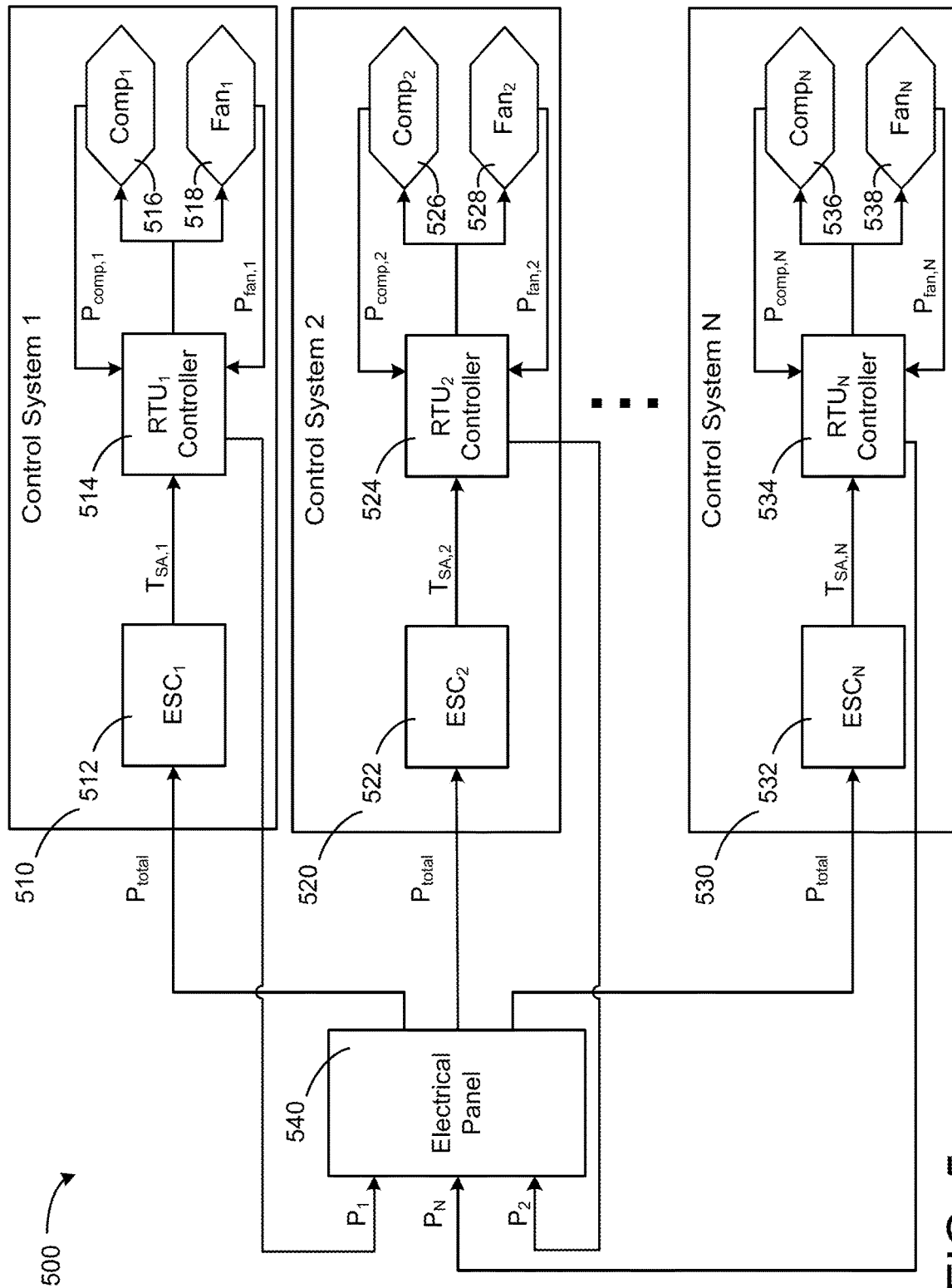
FIG. 5 is a block diagram of an extremum-seeking control system for multiple interacting systems which uses a centralized performance variable aggregator to calculate a performance variable to be optimized by each of the interacting systems, according to some embodiments.

Referring now to FIG. 5, a block diagram of an ESC system 500 that uses a centralized performance variable aggregator to combine performance variables from multiple control systems is shown, according to some embodiments. ESC system 500 is shown to include two or more separate but interacting control systems 510, 520, and 530. Control system 510 is shown to have an extremum-seeking controller 512 that provides a supply air setpoint to roof-top unit controller 514. Controller 514 can receive data from various equipment controlled by system 510, in this case the power consumption of compressor 516 and fan 518. Controller 514 can send performance variable data from the equipment, in this case the combined power consumption of compressor 516 and fan 518 ($P_1$), to a centralized performance variable aggregator such as electrical panel 540.

In some embodiments, ESC system 500 will include one or more additional control systems that interact with system 510. Control system 520 is shown to include extremum-seeking controller 522, roof-top unit controller 524, compressor 526, and fan 528. Controller 524 can send performance variable data from equipment controlled by system 520, in this case $P_2$, to a centralized performance variable aggregator such as electrical panel 540. In addition to control system 520, control system 530 is shown to include extremum-seeking controller 532, roof-top unit controller 534, compressor 536, and fan 538. Controller 534 can send performance variable data from equipment controlled by system 530, in this case $P_N$, to a centralized performance variable aggregator such as electrical panel 540. ESC system 500 can include any number of additional separate but interacting control systems.

Electrical panel 540 is shown to be responsible for calculating a total performance variable $P_{total}$. Panel 540 can send this total performance variable to each extremum-seeking controller operating within system 500 (e.g., $ESC_1 \ldots ESC_N$). In some embodiments, the total performance variable is a sum of the individual performance variables received at panel 540 (i.e. $P_{total}=P_1+P_2+\ldots+P_N$). Each extremum-seeking controller 512, 522, and 532 can receive the total performance variable for the overall system and can operate to optimize the total performance variable $P_{total}$ by performing an extremum-seeking control process (as described with reference to FIGS. 3-4).

Cooperative ESC to Find Global Optimal Solution

Figure 6:
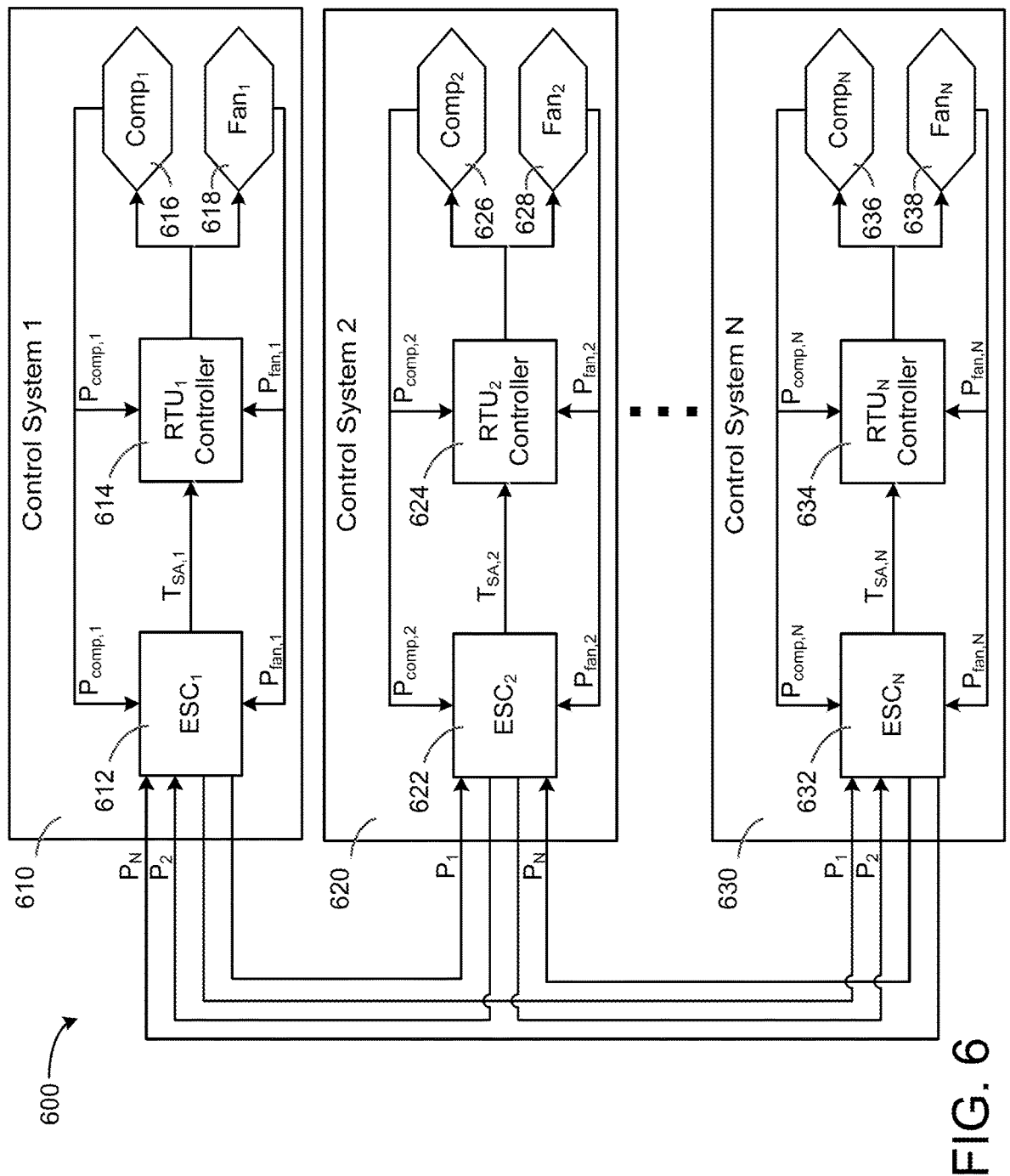
FIG. 6 is a block diagram of an extremum-seeking control system for multiple interacting systems which uses cooperation between two or more extremum-seeking controllers to find the global optimal solution, according to some embodiments.

Referring now to FIG. 6, a block diagram of an ESC system 600 with cooperative extremum-seeking controllers is shown, according to some embodiments. ESC system 600 is shown to have two or more separate but interacting control systems 610, 620, and 630. Control system 610 is shown to include an extremum-seeking controller 612 that provides a supply air setpoint to roof-top unit controller 614. Performance variable data from equipment controlled by system 610, in this case compressor 616 and fan 618, can be received by extremum-seeking controller 612 and roof-top unit controller 614.

In some embodiments, ESC system 600 includes one or more additional control systems that interact with system 610. Control system 620 is shown to include extremum-seeking controller 622, roof-top unit controller 624, compressor 626, and fan 628. Performance variable data from equipment controlled by system 620, in this case compressor 626 and fan 628, can be received by extremum-seeking controller 622 and roof-top unit controller 624. In addition to control system 620, control system 630 is shown to include extremum-seeking controller 632, roof-top unit controller 634, compressor 636, and fan 638. Performance variable data from equipment controlled by system 630, in this case compressor 636 and fan 638, can be received by extremum-seeking controller 632 and roof-top unit controller 634. ESC system 600 can include any number of additional separate but interacting control systems.

Each of extremum-seeking controllers 612-632 can be configured to calculate a total performance variable for its respective control system. For instance, controller 612 can receive power consumption data from compressor 616 and fan 618, and can add these signals together to obtain the total power consumption of system 610 (i.e., $P_1 = P_{comp,1} + P_{fan,1}$). Extremum-seeking controller 612 is shown to share the total power consumption $P_1$ of system 610 with extremum-seeking controllers 622 and 632. In a similar fashion, all additional extremum-seeking controllers 622 and 632 share performance data from their respective control systems with controller 612. This peer-to-peer communication allows each extremum-seeking controller within system 600 to calculate a total performance variable for the overall system (e.g., $P_{total}=P_1+P_2+\ldots+P_N$) without the need for a centralized performance variable aggregator such as panel 540, as described with reference to FIG. 5.

Each of extremum-seeking controllers 612-632 can be configured to use the total performance variable $P_{total}$ as an input to an extremum-seeking control process to generate and provide globally optimal supply air temperature setpoints to roof-top unit controllers 614-634. For example, each of extremum-seeking controllers 612-632 can be configured to modulate the corresponding supply air temperature setpoint (e.g., $T_{SA,1}, T_{SA,2}, \ldots, T_{SA,N}$) to drive the total performance variable $P_{total}$ to its optimal value (as described with reference to FIGS. 3-4).

Figure 7:
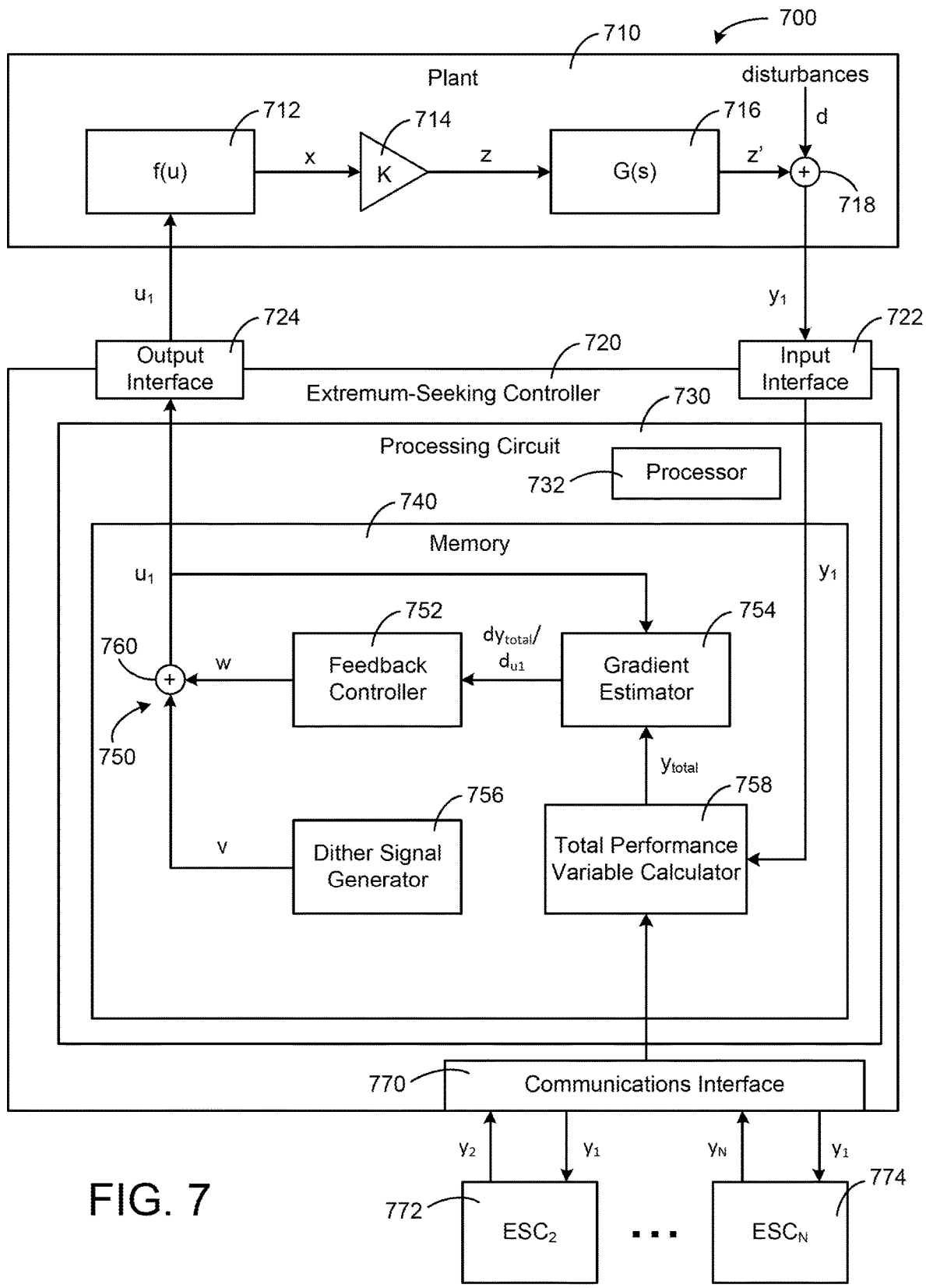
FIG. 7 is a block diagram illustrating one of the extremum-seeking controllers of FIG. 6 in greater detail, according to some embodiments.

Referring now to FIG. 7, a block diagram of an ESC system 700 with cooperative extremum-seeking controllers is shown, according to some embodiments. ESC system 700 is shown to include a plant 710 and an extremum-seeking controller 720. Controller 720 may be any of the extremum-seeking controllers shown in FIG. 6. Controller 720 is shown receiving a performance variable $y_1$ as feedback from plant 710 via input interface 722 and providing a control input $u_1$ to plant 710 via output interface 724. Controller 720 may also receive one or more additional performance variables (i.e., $y_2 \ldots y_N$) from controllers operating on equipment that interacts with plant 710, similar to controllers 622 and 632 as described with reference to FIG. 6. Controller 720 is shown to include total performance variable calculator 758 that may sum all of the individual performance variables for the overall system to obtain a total performance variable $y_{total}$ (e.g., $y_{total}=y_1+y_2+\ldots+y_N$). Controller 720 may operate in a manner similar to controllers 302 and 402, as described with reference to FIGS. 3-4. For example, controller 720 can use an extremum-seeking control (ESC) strategy to optimize the performance variable $y_{total}$. Controller 720 may perturb the control input $u_1$ with a periodic dither signal v. Controller 720 can adjust the control input $u_1$ to drive the gradient of performance variable $y_{total}$ to zero. In this way, controller 720 identifies values for control input $u_1$ that achieve an optimal value (e.g., a maximum or a minimum) for a total system performance variable $y_{total}$.

In some embodiments, the ESC logic implemented by controller 720 generates values for control input $u_1$ based on a received control signal (e.g., a setpoint, an operating mode signal, etc.). The control signal may be received from a user control (e.g., a thermostat, a local user interface, etc.), client devices (e.g., computer terminals, mobile user devices, cellular phones, laptops, tablets, desktop computers, etc.), a supervisory controller, or any other external system or device. In various embodiments, controller 720 can communicate with external systems and devices directly (e.g., using NFC, Bluetooth, Wi-Fi direct, cables, etc.) or via a communications network (e.g., a BACnet network, a LonWorks network, a LAN, a WAN, the Internet, a cellular network, etc.) using wired or wireless electronic data communications.

Plant 710 can be similar to plant 404, as described with reference to FIG. 4. For example, plant 710 can be a combination of a process and one or more mechanically-controlled outputs. In some embodiments, plant 710 is an air handling unit configured to control temperature within a building space via one or more mechanically-controlled actuators and/or dampers. In other embodiments, plant 710 can include a chiller operation process, a damper adjustment process, a mechanical cooling process, a ventilation process, or any other process that generates an output based on one or more control inputs.

Plant 710 can be represented mathematically as a static nonlinearity in series with a dynamic component. For example, plant 710 is shown to include a static nonlinear function block 712 in series with a constant gain block 714 and a transfer function block 716. Although the components of plant 710 are shown in FIG. 7, it should be noted that the actual mathematical model for plant 710 does not need to be known in order to apply ESC. Plant 710 receives a control input $u_1$ (e.g., a control signal, a manipulated variable, etc.) from extremum-seeking controller 720 via output interface 724. Nonlinear function block 712 can use the control input $u_1$ to generate a function signal x based on the control input (e.g., $x=f(u_1)$). Function signal x can be passed to constant gain block 714, which multiplies the function signal x by the constant gain K to generate the output signal z (i.e., $z=Kx$). The output signal z can be passed through transfer function block 716 to produce signal z', which is modified by disturbances d to produce performance variable $y_1$ (e.g., $y_1=z'+d$). Disturbances d can include process noise, measurement noise, or a combination of both. Performance variable $y_1$ is provided as an output from plant 710 and received at extremum-seeking controller 720.

Still referring to FIG. 7, controller 720 is shown to include a communications interface 770, an input interface 722, and an output interface 724. Interfaces 770 and 722-724 can include any number of jacks, wire terminals, wire ports, wireless antennas, or other communications interfaces for communicating information and/or control signals. Interfaces 770 and 722-724 can be the same type of devices or different types of devices. For example, input interface 722 can be configured to receive an analog feedback signal (e.g., an output variable, a measured signal, a sensor output, a controlled variable) from plant 710, whereas communications interface 770 can be configured to receive a digital setpoint signal from a supervisory controller. Output interface 724 can be a digital output (e.g., an optical digital interface) configured to provide a digital control signal (e.g., a manipulated variable, a control input) to plant 710. In other embodiments, output interface 724 is configured to provide an analog output signal.

In some embodiments interfaces 770 and 722-724 can be joined as one or two interfaces rather than three separate interfaces. For example, communications interface 770 and input interface 722 can be combined as one Ethernet interface configured to receive network communications from a supervisory controller. In some embodiments, a supervisory controller provides both a setpoint and feedback via an Ethernet network. In such an embodiment, output interface 724 may be specialized for a controlled component of plant 710. In other embodiments, output interface 724 can be another standardized communications interface for communicating data or control signals. Interfaces 770 and 722-724 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Still referring to FIG. 7, controller 720 is shown to include a processing circuit 730 having a processor 732 and memory 740. Processor 732 can be a general purpose or specific purpose processor, an application specific integrated circuit (ASIC), one or more field programmable gate arrays (FPGAs), a group of processing components, or other suitable processing components. Processor 732 is configured to execute computer code or instructions stored in memory 740 or received from other computer readable media (e.g., CD-ROM, network storage, a remote server, etc.).

Memory 740 can include one or more devices (e.g., memory units, memory devices, storage devices, etc.) for storing data and/or computer code for completing and/or facilitating the various processes described in the present disclosure. Memory 740 can include random access memory (RAM), read-only memory (ROM), hard drive storage, temporary storage, non-volatile memory, flash memory, optical memory, or any other suitable memory for storing software objects and/or computer instructions. Memory 740 can include database components, object code components, script components, or any other type of information structure for supporting the various activities and information structures described in the present disclosure. Memory 740 can be communicably connected to processor 732 via processing circuit 730 and can include computer code for executing (e.g., by processor 732) one or more processes described herein.

Still referring to FIG. 7, extremum-seeking controller 720 is shown receiving performance variable $y_1$ via input interface 722 and providing performance variable $y_1$ to total performance variable calculator 758. Communications interface 770 is shown to receive one or more additional performance variables (i.e., $y_2 \ldots y_N$) from extremum-seeking controllers 772 and 774 operating on equipment that interacts with plant 710. Total performance variable calculator 758 can add all of the performance variables received in order to provide a total performance variable $y_{total}$ to control loop 750 within controller 720. Control loop 750 is shown to include a gradient estimator 754, a feedback controller 752, and an excitation signal element 760. Gradient estimator 754 may be configured to determine the gradient $$\frac{dy_{total}}{du_1}$$

of the performance variable $y_{total}$ with respect to the control input $u_1$. Feedback controller 752 can be configured to adjust the DC value of the control input $u_1$ (i.e., the variable w) to drive the gradient $$\frac{dy_{total}}{du_1}$$

to zero. A dither signal generator 756 is shown to produce the dither signal used to perturb control input $u_1$ at excitation signal element 760.

Example Graphs

Figure 8:
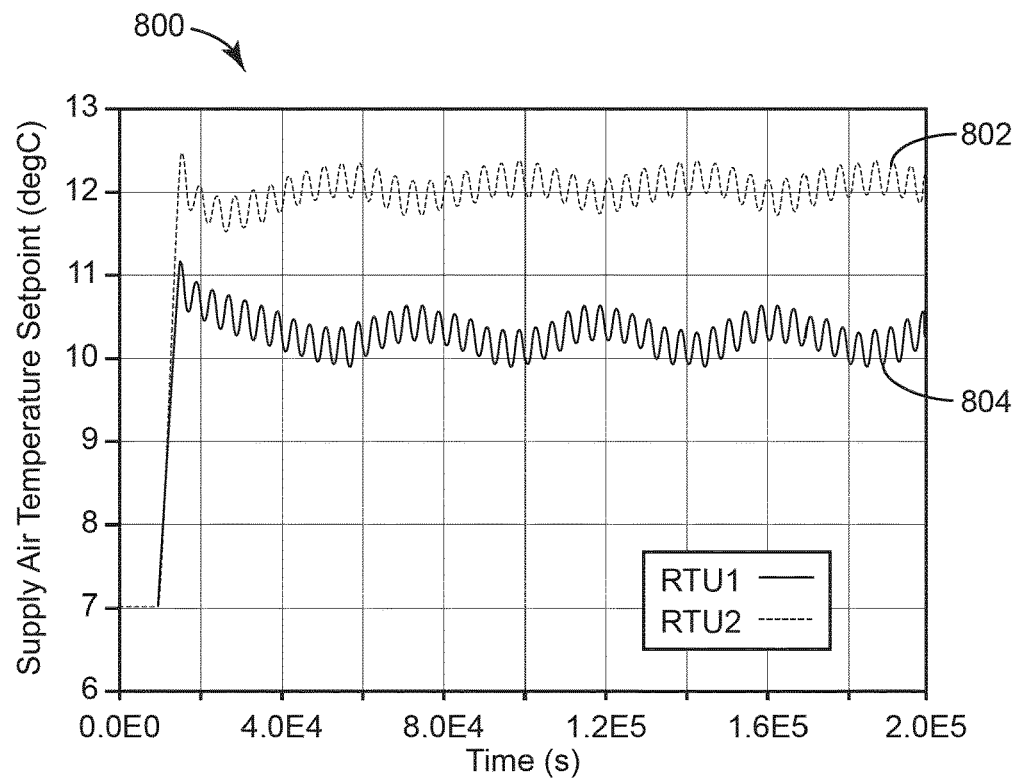
FIG. 8 is a graph of supply air setpoints for two roof-top units being modified by cooperating extremum-seeking controllers over time, according to some embodiments.
Figure 9:
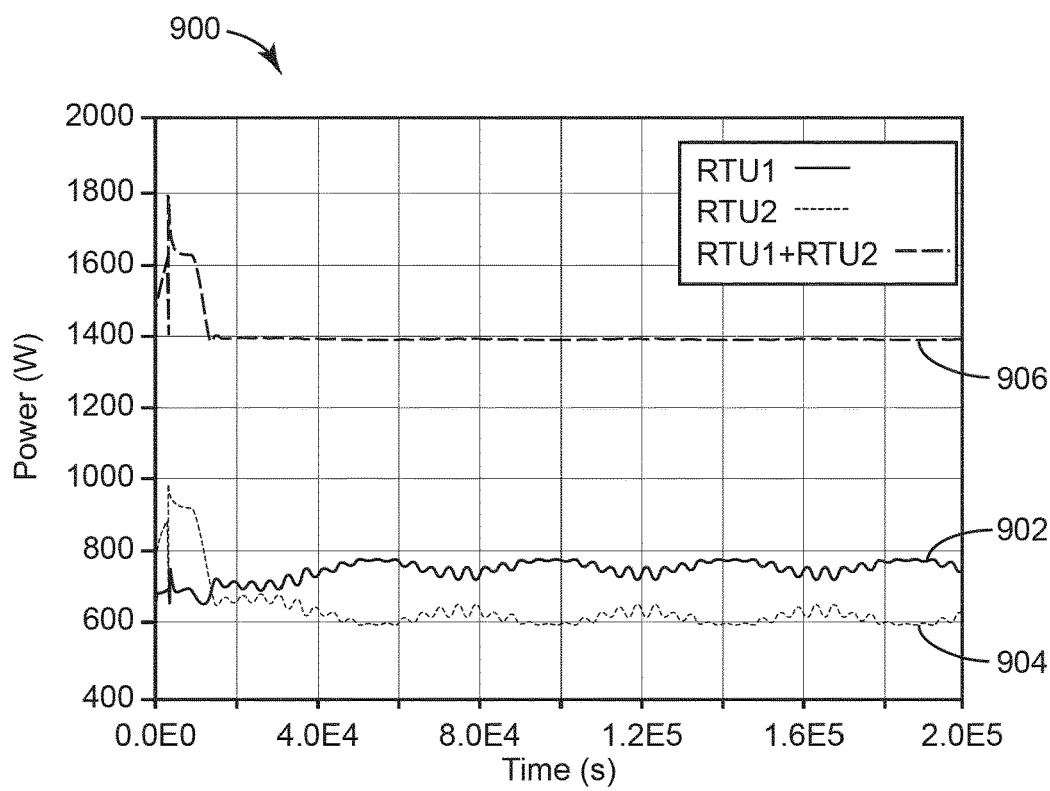
FIG. 9 is a graph of power consumption of two roof-top units being modified by cooperating extremum-seeking controllers as well as total power of the two units over time, according to some embodiments.

Referring now to FIGS. 8-9, two graphs 800-900 demonstrating the benefits of cooperative extremum-seeking control methods are shown, according to some embodiments. Referring particularly to FIG. 8, graph 800 shows the supply air temperature setpoints for two roof-top units being modified by cooperating extremum-seeking controllers. Line 804 depicts a time-varying control input (supply air temperature setpoint) sent to a plant (RTU1) by an extremum seeking controller such as controller 720. Line 802 depicts another time-varying supply air temperature setpoint provided by an extremum-seeking controller operating on a separate but interacting roof-top unit (RTU2). The extremum-seeking controllers producing the data depicted in graph 800 are operating independently but they share performance variable data with each other. The high frequency oscillations shown result from perturbing the control input with a dither signal as previously described. The lower frequency oscillations result from the cooperation between the two controllers.

Referring particularly to FIG. 9, the power consumption of the same two roof-top units from graph 800 are shown in graph 900. Lines 902 and 904 are analogous to lines 802 and 804. The high frequency oscillations from the use of dither signals as well as the low frequency oscillation from cooperation between controllers can still be seen in the power consumption graph. Line 906 shows the combined power consumption of RTU1 and RTU2 which demonstrates an important benefit of the present disclosure. Cooperation between extremum-seeking controllers allows the total power consumption of the overall ESC system to quickly reach a minimum and remain there.

Extremum-Seeking Control Techniques

Figure 10:
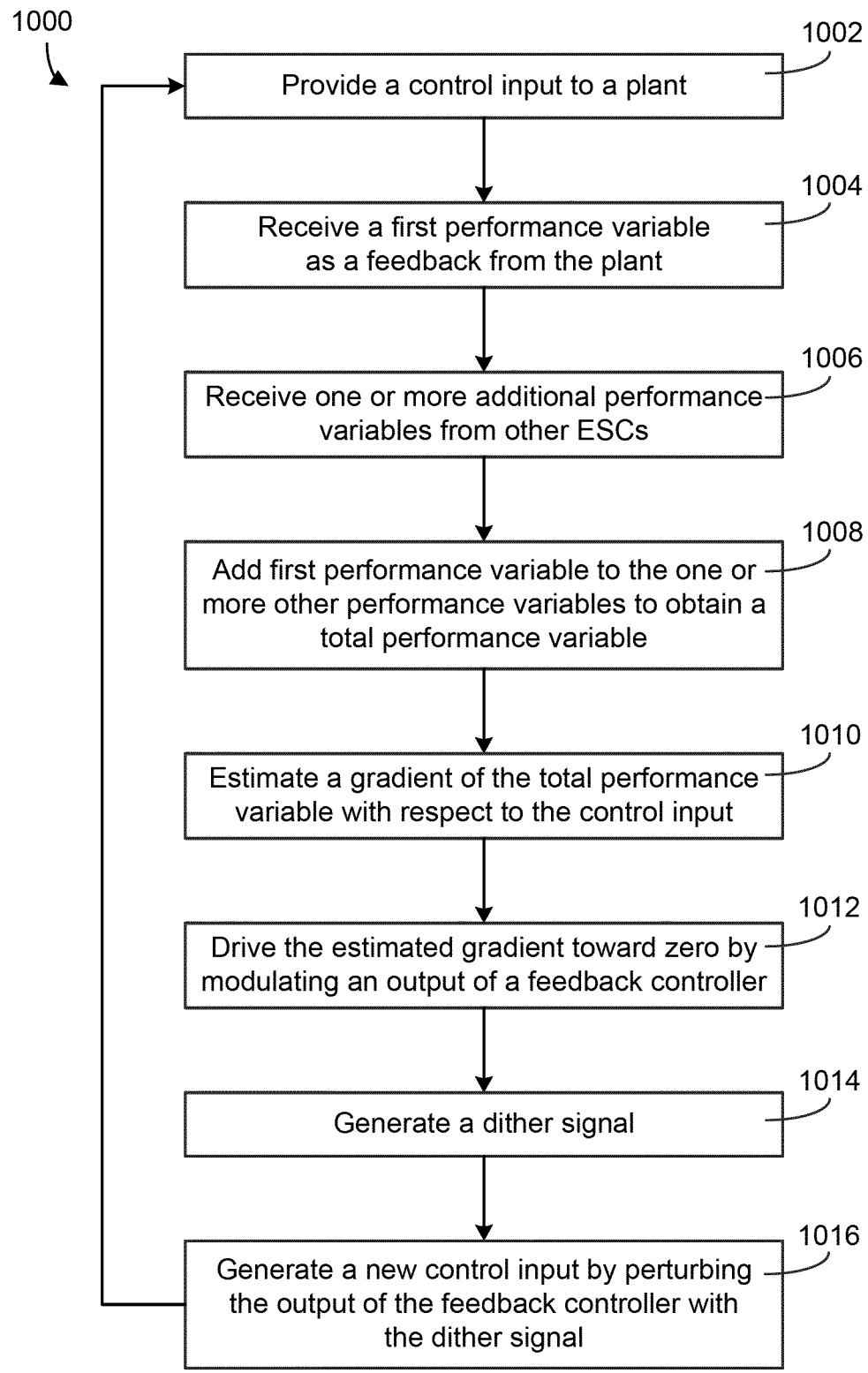
FIG. 10 is a flow diagram illustrating a cooperative extremum-seeking control technique, according to some embodiments.

Referring now to FIG. 10, a flow diagram 1000 illustrating a cooperative extremum-seeking control (ESC) technique is shown, according to some embodiments. The ESC technique shown in flow diagram 1000 can be performed by one or more components of an extremum-seeking controller (e.g., controller 720) to monitor and control a plant (e.g., plant 710). For example, controller 720 can use an ESC technique to determine an optimal value of a control input $u_1$ provided to plant 710 by perturbing the control input $u_1$ with a periodic dither signal v.

Flow diagram 1000 is shown to include providing a control input $u_1$ to a plant (block 1002) and receiving a first performance variable $y_1$ as a feedback from a plant (block 1004). A plant in control theory is the combination of a process and one or more mechanically-controlled outputs. The plant can be any of the plants previously described (e.g., plant 304, plant 404, plant 710, etc.) or any other controllable system or process. For example, the plant can be an air handling unit configured to control temperature within a building space via one or more mechanically-controlled actuators and/or dampers. In various embodiments, the plant can include a chiller operation process, a damper adjustment process, a mechanical cooling process, a ventilation process, a refrigeration process, or any other process in which a control input $u_1$ to the plant is adjusted to affect the performance variable $y_1$.

The performance variable $y_1$ can be a measured variable observed by one or more sensors of the plant (e.g., a measured power consumption, a measured flow rate, etc.), a calculated variable based on measured or observed values (e.g., a calculated efficiency, a calculated power consumption, a calculated cost, etc.) or any other type of variable that indicates the performance of the plant in response to the control input $u_1$. The control input $u_1$ can be provided by an extremum-seeking controller and/or a feedback controller for the plant. The controller can be any of the controllers previously described (e.g., controller 302, controller 402, controller 720, etc.) or any other type of controller that provides a control input $u_1$ to a plant. In some embodiments, the controller is an extremum-seeking controller configured to achieve an optimal value for a performance variable $y_{total}$ by adjusting the control input $u_1$. The optimal value can be an extremum (e.g., a maximum or a minimum) of the performance variable $y_{total}$.

Flow diagram 1000 is also shown to include receiving one or more additional performance variables $y_2 \ldots y_N$ from additional extremum-seeking controllers operating on separate but interacting plants (block 1006). In some embodiments, the first performance variable $y_1$ and the one or more additional performance variables $y_2 \ldots y_N$ each indicate the performance of a corresponding plant. For example, the first performance variable $y_1$ may indicate the power consumption of a first plant, whereas the one or more additional performance variables $y_2 \ldots y_N$ may indicate the power consumption of one or more additional plants that interact with the first plant. In some embodiments, the performance variables are variables that can be aggregated to calculate a cumulative performance of the combined system. In some embodiments, the first performance variable $y_1$ is provided to each of the additional extremum-seeking controllers. The extremum-seeking controllers may exchange performance variable information with each other such that each extremum-seeking controller is provided with all of the performance variables $y_1 \ldots y_N$.

Flow diagram 1000 is shown to include adding the first performance variable $y_1$ to the one or more other performance variables $y_2 \ldots y_N$ to obtain a total performance variable $y_{total}$ for the system (block 1008). In some embodiments, the adding is performed by each extremum-seeking controller in the combined system. For example, each extremum-seeking controller can independently add all of the performance variables together to calculate the total performance variable $y_{total}$. Advantageously, performing the adding at each extremum-seeking controller avoids the need for a supervisory controller or other centralized performance variable aggregator.

Flow diagram 1000 is shown to include estimating a gradient of the total performance variable $y_{total}$ with respect to the control input $u_1$ (block 1010). In some embodiments, the gradient is the performance gradient p described with reference to FIG. 4. In other embodiments, the gradient can also be the performance gradient $$\frac{dy_{total}}{du_1}.$$

For example, the gradient can be a slope or derivative of a curve defined by the function $y_{total}=f(y_1)$ at a particular location along the curve (e.g., at a particular value of $u_1$). The gradient can be estimated using one or more pairs of values for the control input $u_1$ and the performance variable $y_{total}$.

Still referring to FIG. 10, flow diagram 1000 is shown to include driving the estimated gradient toward zero by modulating an output of a feedback controller (block 1012). In some embodiments, the feedback controller is feedback controller 752 shown in FIG. 7. The feedback controller can receive the estimated gradient as an input and can modulate its output (e.g., DC output w) to drive the estimated gradient toward zero. The feedback controller can increase or decrease the value of the DC output w until an optimum value for the DC output w is reached. The optimum value of the DC output w can be defined as the value which results in an optimum value (e.g., a maximum or minimum value) of the performance variable $y_{total}$. The optimum value of the performance variable $y_{total}$ occurs when the gradient is zero. Accordingly, the feedback controller can achieve the optimum value of the performance variable $y_{total}$ by modulating its output w to drive the gradient to zero.

Flow diagram 1000 is shown to include generating a dither signal v (block 1014) and generating a new control input $u_1$ by perturbing the output w of the feedback controller with the dither signal v (block 1016). The dither signal v can be generated by dither signal generator 756, as described with reference to FIG. 7. The dither signal v can be added to the DC value w generated by the feedback controller to form the new control input $u_1$ (e.g., $u_1=w+v$). After the new control input $u_1$ is generated, it can be provided to the plant (block 1002) and the ESC control technique can be repeated. The dither signal v can provide variation in the control input $u_1$ sufficient to estimate the performance gradient in block 1010. In some instances, the addition of dither signal v causes the control input $u_1$ to drift away from its optimum value. However, the feedback controller can compensate for such drift by adjusting the DC value w such that the control input $u_1$ is continuously pulled back toward its optimum value. The magnitude and frequency of the dither signal v can be selected (e.g., manually by a user or automatically by the controller) to overcome any additive noise found in the performance variable $y_{total}$ (e.g., process noise, measurement noise, etc.).

Example Implementations

Figure 11:
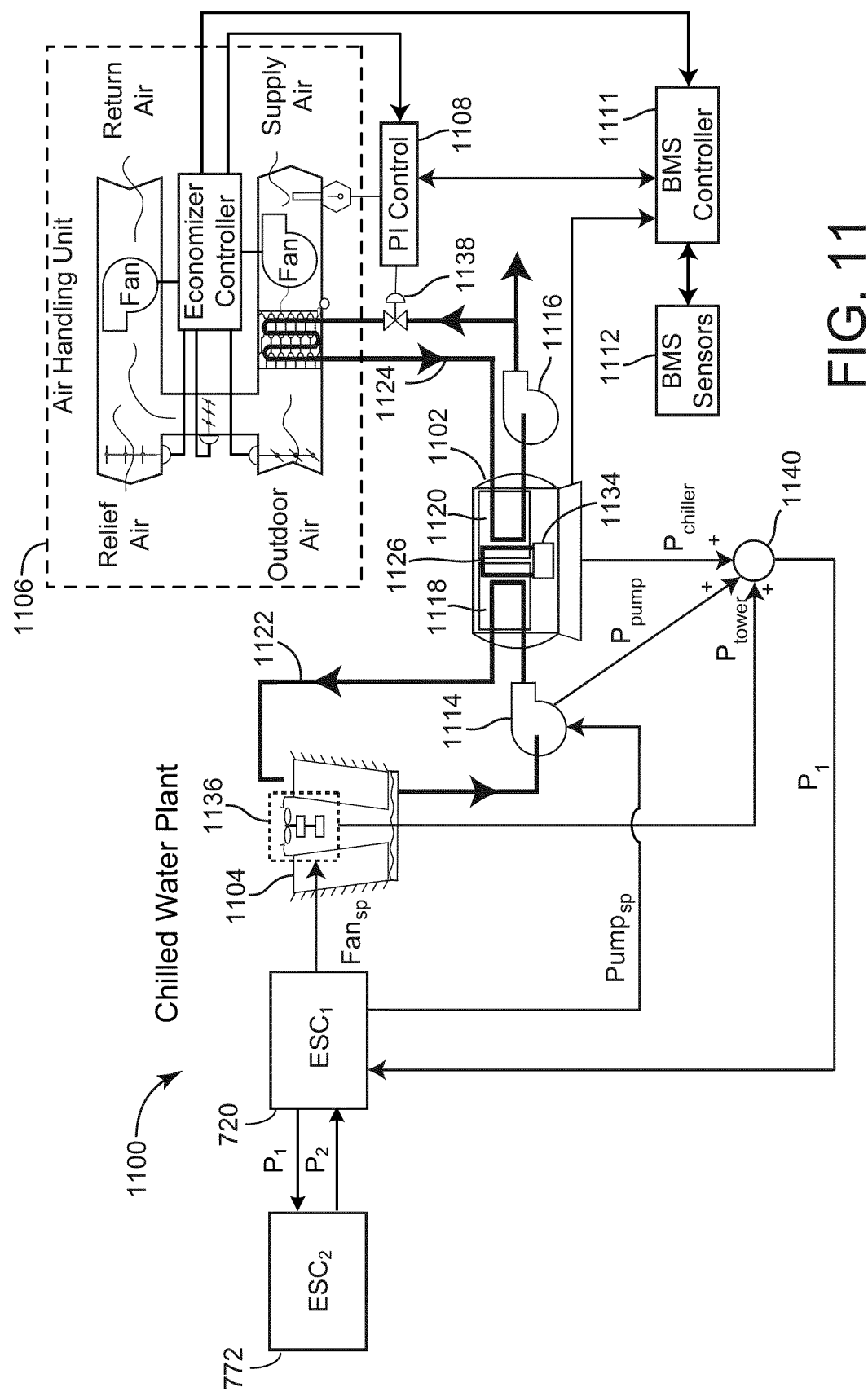
FIG. 11 is a block diagram of a chilled water plant in which the systems and methods of the present disclosure can be implemented, according to some embodiments.
Figure 12:
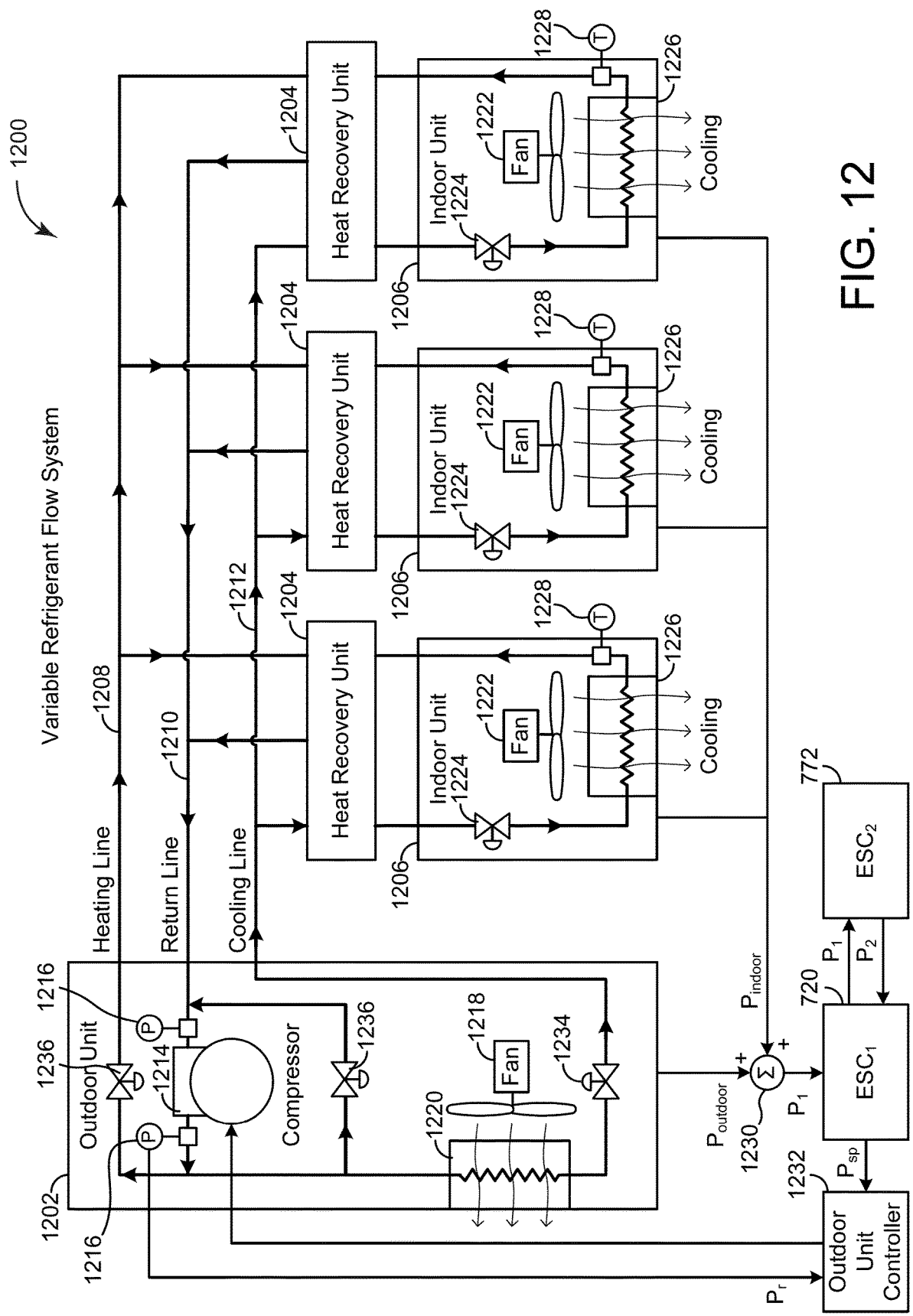
FIG. 12 is a block diagram of a variable refrigerant flow system in which the systems and methods of the present disclosure can be implemented, according to some embodiments.
Figure 13:
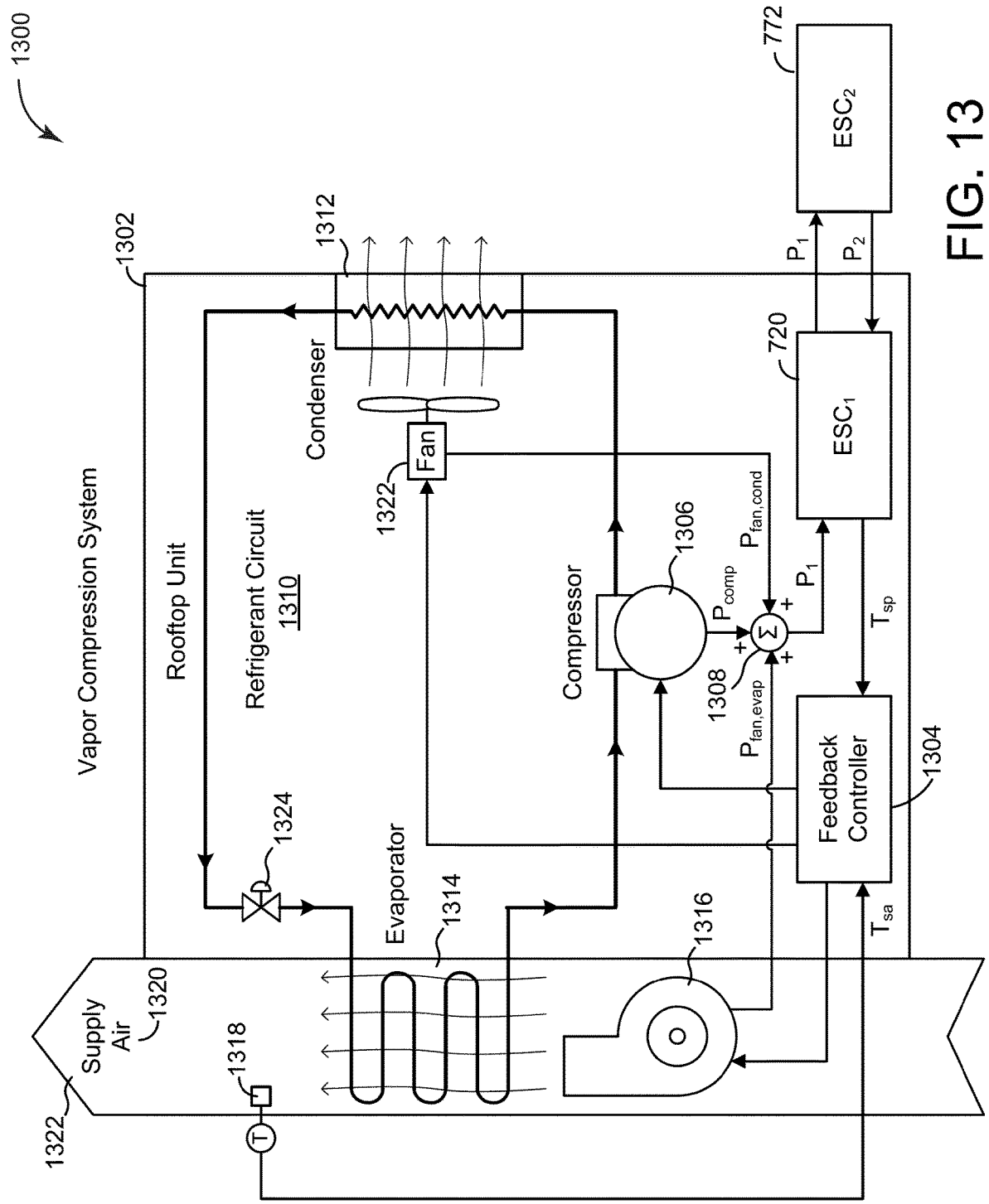
FIG. 13 is a block diagram of a vapor compression system in which the systems and methods of the present disclosure can be implemented, according to some embodiments.

Referring now to FIGS. 11-13 some example implementations of the extremum-seeking control systems and methods of the present disclosure are shown. The implementations shown in FIGS. 11-13 illustrate various embodiments of plant 710 which can be controlled by extremum-seeking controller 720, the control input(s) $u_1$ which can be provided to plant 710 by extremum-seeking controller 720, the performance variable(s) $y_1$ which can be received as feedback from plant 710 by extremum seeking controller 720, and one or more additional performance variables $y_2 \ldots y_N$ which can be received as feedback from extremum-seeking controllers operating on equipment interacting with plant 710.

Chilled Water Plant

Referring now to FIG. 11, a chilled water plant 1100 is shown, according to some embodiments. Chilled water plant 1100 is shown to include a chiller 1102, a cooling tower 1104, and an air handling unit (AHU) 1106. The flow of chilled fluid to AHU 1106 can be variably controlled by components such as PI control 1108 that may be supervised by one or more building management system (BMS) controllers 1111 receiving data from BMS sensors 1112. Chiller 1102 is connected with cooling tower 1104 by a condenser water loop 1122. A water pump 1114 located along condenser water loop 1122 circulates condenser water between cooling tower 1104 and chiller 1102. A cooling tower fan system 1136 provides airflow through cooling tower 1104 to facilitate cooling the condenser water within cooling tower 1104. Chiller 1002 is also connected with AHU 1106 via a chilled fluid loop 1124. A chilled fluid pump 1116 located along chilled fluid loop 1124 circulates a chilled fluid between chiller 1102 and AHU 1106.

Extremum seeking controller 720 is shown receiving a power input $P_1$ representing the total power consumed by cooling tower fan system 1136 $P_{tower}$, condenser water pump 1114 $P_{pump}$, and the compressor 1134 of chiller 1102 $P_{chiller}$ (i.e., $P_1=P_{tower}+P_{pump}+P_{chiller}$). In the embodiment shown in FIG. 11, the system power $P_1$ includes $P_{tower}$, $P_{pump}$, and $P_{chiller}$. These inputs are summed outside of controller 720 at summation block 1140. However, in various other embodiments, the system power $P_1$ can include any combination of power inputs. For example, the system power $P_1$ can include the power consumption of the fans within AHU 1106, the power consumption of chilled fluid pump 1116, and/or any other power consumption that occurs within chilled water plant 1100.

Extremum seeking controller 720 is shown providing a first control signal regulating the fan speed $Fan_{sp}$ of cooling tower fan system 1136 and a second control signal regulating the pump speed $Pump_{sp}$ of condenser water pump 1114. In some embodiments, the fan speed $Fan_{sp}$ and the pump speed $Pump_{sp}$ are the manipulated variables which extremum seeking controller 720 adjusts to affect the system power $P_1$. For example, extremum seeking controller 720 can increase the pump speed $Pump_{sp}$ to control the heating in refrigerant loop 1126 via condenser 1118 and evaporator 1120. Similarly, extremum seeking controller 720 can increase the fan speed $Fan_{sp}$ to increase the amount of heat removed from the condenser water by cooling tower 1104 or decrease the fan speed $Fan_{sp}$ to decrease the amount of heat removed from the condenser water by cooling tower 1104.

Still referring to FIG. 11, extremum-seeking controller 772 is shown to be connected to extremum-seeking controller 720 in order to share performance variable data. In some embodiments, extremum-seeking controller 772 is configured to control a second set of chilled water plant equipment (e.g., another chiller, another pump, another cooling tower, etc.) and provides control input(s) to that equipment. Extremum-seeking controller 772 can be configured to monitor the power consumption $P_2$ of the second set of chilled water plant equipment. Extremum-seeking controller 720 can be configured to send the power consumption $P_1$ to extremum-seeking controller 772. Similarly, extremum-seeking controller 772 can be configured to send the power consumption $P_2$ to extremum-seeking controller 720. Each extremum-seeking controller 720 and 772 can be configured to calculate a total performance variable based on the power consumption values. In this case, the total performance variable is the combined power consumption of equipment controlled by extremum-seeking controllers 720 and 772 (i.e., $P_{total}=P_1+P_2$). It should be noted that this ESC system can include any amount of additional extremum-seeking controllers operating on separate but interacting equipment.

Each extremum-seeking controller 720 and 772 can be configured to independently optimize the total power consumption $P_{total}$ by adjusting the control inputs provided by that controller. For example, extremum-seeking controller 720 can modulate the fan speed $Fan_{sp}$ and the pump speed $Pump_{sp}$ to drive the total power consumption $P_{total}$ to an optimal value. In other words, the total power consumption $P_{total}$ may be the variable which each extremum-seeking controller 720 and 772 seeks to optimize.

Variable Refrigerant Flow System

Referring now to FIG. 12, a variable refrigerant flow (VRF) system 1200 is shown, according to some embodiments. VRF system 1200 is shown to include an outdoor unit 1202, several heat recovery units 1204, and several indoor units 1206. In some embodiments, outdoor unit 1202 is located outside a building (e.g., on a rooftop) whereas indoor units 1206 are distributed throughout the building (e.g., in various rooms or zones of the building). In some embodiments, VRF system 1200 includes several heat recovery units 1204. Heat recovery units 1204 can control the flow of a refrigerant between outdoor unit 1204 and indoor units 1206 (e.g., by opening or closing valves) and can minimize the heating or cooling load to be served by outdoor unit 1202.

Outdoor unit 1202 is shown to include a compressor 1214 and a heat exchanger 1220. Compressor 1214 circulates a refrigerant between heat exchanger 1220 and indoor units 1206. Heat exchanger 1220 can function as a condenser (allowing the refrigerant to reject heat to the outside air) when VRF system 1200 operates in a cooling mode or as an evaporator (allowing the refrigerant to absorb heat from the outside air) when VRF system 1200 operates in a heating mode. A fan 1218 provides airflow through heat exchanger 1220. The speed of fan 1218 can be adjusted to modulate the rate of heat transfer into or out of the refrigerant in heat exchanger 1220.

Each indoor unit 1206 is shown to include a heat exchanger 1226 and an expansion valve 1224. Each of heat exchangers 1226 can function as a condenser (allowing the refrigerant to reject heat to the air within the room or zone) when the indoor unit 1206 operates in a heating mode or as an evaporator (allowing the refrigerant to absorb heat from the air within the room or zone) when the indoor unit 1206 operates in a cooling mode. Fans 1222 provide airflow through heat exchangers 1226. The speeds of fans 1222 can be adjusted to modulate the rate of heat transfer into or out of the refrigerant in heat exchangers 1226. Temperature sensors 1228 can be used to measure the temperature of the refrigerant within indoor units 1206.

In FIG. 12, indoor units 1206 are shown operating in the cooling mode. In the cooling mode, the refrigerant is provided to indoor units 1206 via cooling line 1212. The refrigerant is expanded by expansion valves 1224 to a cold, low pressure state and flows through heat exchangers 1226 (functioning as evaporators) to absorb heat from the room or zone within the building. The heated refrigerant then flows back to outdoor unit 1202 via return line 1210 and is compressed by compressor 1214 to a hot, high pressure state. The compressed refrigerant flows through heat exchanger 1220 (functioning as a condenser) and rejects heat to the outside air. The cooled refrigerant can then be provided back to indoor units 1206 via cooling line 1212. In the cooling mode, flow control valves 1236 can be closed and expansion valve 1234 can be completely open.

In the heating mode, the refrigerant is provided to indoor units 1206 in a hot state via heating line 1208. The hot refrigerant flows through heat exchangers 1226 (functioning as condensers) and rejects heat to the air within the room or zone of the building. The refrigerant then flows back to outdoor unit via cooling line 1212 (opposite the flow direction shown in FIG. 12A). The refrigerant can be expanded by expansion valve 1234 to a colder, lower pressure state. The expanded refrigerant flows through heat exchanger 1220 (functioning as an evaporator) and absorbs heat from the outside air. The heated refrigerant can be compressed by compressor 1214 and provided back to indoor units 1206 via heating line 1208 in a hot, compressed state. In the heating mode, flow control valves 1236 can be completely open to allow the refrigerant from compressor 1214 to flow into heating line 1208.

Extremum seeking controller 720 is shown receiving a power input $P_1$ representing the power consumed by outdoor unit 1202 $P_{outdoor}$ and the total power consumed by each of indoor units 1206 $P_{indoor}$ (i.e., $P_1=P_{outdoor}+P_{indoor}$). The outdoor unit power $P_{outdoor}$ can include the power consumption of compressor 1214 and/or fan 1218. The indoor unit power $P_{indoor}$ can include the power consumption of fans 1222 and/or any other power-consuming devices within indoor units 1206 or heat recovery units 1204 (e.g., electronic valves, pumps, fans, etc.). As illustrated in FIG. 12, the power inputs $P_{outdoor}$ and $P_{indoor}$ can be summed outside of extremum seeking controller 720 at summing block 1230 to provide a combined signal representative of the total power $P_{total}$. In other embodiments, extremum seeking controller 720 receives the individual power inputs $P_{outdoor}$ and $P_{indoor}$ and conducts the summation of summing block 1230. In either case, extremum seeking controller 720 can be said to receive the power inputs $P_{outdoor}$ and $P_{indoor}$ even if the power inputs are provided as a single summed or combined signal $P_{total}$ representing the total system power.

The system power $P_1$ can include the power consumption of one or more components of VRF system 1200. In the embodiment shown in FIG. 12, the system power $P_1$ includes $P_{outdoor}$ and $P_{indoor}$. However, in various other embodiments, the system power $P_1$ can include any combination of power inputs. For example, the system power $P_1$ can include the power consumption of heat recovery units 1204, indoor units 1206, outdoor unit 1202, pumps, and/or any other power consumption that occurs within VRF system 1200.

Extremum seeking controller 720 is shown providing a pressure setpoint $P_{sp}$, to an outdoor unit controller 1232. In some embodiments, the pressure setpoint $P_{sp}$, is the manipulated variable which extremum seeking controller 720 adjusts to affect the system power $P_1$. The pressure setpoint $P_{sp}$, is a setpoint for the pressure of the refrigerant $P_r$ at the suction or the discharge of compressor 1214. The refrigerant pressure $P_r$ can be measured by a pressure sensor 1216 located at the suction of compressor 1214 (e.g., upstream of compressor 1214) or at the discharge of compressor 1214 (e.g., downstream of compressor 1214). Outdoor unit controller 1232 is shown receiving the refrigerant pressure $P_r$ as a feedback signal.

Outdoor unit controller 1232 can operate outdoor unit 1202 to achieve the pressure setpoint $P_{sp}$, provided by extremum seeking controller 720. Operating outdoor unit 1202 can include adjusting the speed of compressor 1214 and/or the speed of fan 1218. For example, outdoor unit controller 1232 can increase the speed of compressor 1214 to increase compressor discharge pressure or decrease the compressor suction pressure. Outdoor unit controller 1232 can increase the speed of fan 1218 to increase the heat transfer within heat exchanger 1220 or decrease the speed of fan 1218 to decrease the heat transfer within heat exchanger 1220.

Extremum seeking controller 720 implements an extremum seeking control strategy that dynamically searches for an unknown input (e.g., pressure setpoint $P_{sp}$) to obtain system performance that trends near optimal. Although outdoor unit controller 1232 and extremum seeking controller 720 are shown as separate devices, it is contemplated that outdoor unit controller 1232 and extremum seeking controller 720 can be combined into a single device in some embodiments (e.g., a single controller that performs the functions of both extremum seeking controller 502 and outdoor unit controller 1232). For example, extremum seeking controller 720 can be configured to operate compressor 1214 and/or fan 1218 directly without requiring an intermediate outdoor unit controller 1232.

Still referring to FIG. 12, extremum-seeking controller 772 is shown to be connected to extremum-seeking controller 720 in order to share performance variable data. In some embodiments, extremum-seeking controller 772 is configured to control a second set of refrigerant flow equipment (e.g., additional recovery units, indoor units, outdoor units, etc.) and provides control input(s) to that equipment. Extremum-seeking controller 772 can be configured to monitor the power consumption $P_2$ of the second set of refrigerant flow equipment. Extremum-seeking controller 720 can be configured to send the power consumption $P_1$ to extremum-seeking controller 772. Similarly, extremum-seeking controller 772 can be configured to send the power consumption $P_2$ to extremum-seeking controller 720. Each extremum-seeking controller 720 and 772 can be configured to calculate a total performance variable based on the power consumption values. In this case, the total performance variable is the combined power consumption of equipment controlled by extremum-seeking controllers 720 and 772 (i.e., $P_{total} = P_1 + P_2$). It should be noted that this ESC system can include any amount of additional extremum-seeking controllers operating on separate but interacting equipment.

Each extremum-seeking controller 720 and 772 can be configured to independently optimize the total power consumption $P_{total}$ by adjusting the control inputs provided by that controller. For example, extremum-seeking controller 720 can modulate the pressure setpoint $P_{sp}$ to drive the total power consumption $P_{total}$ to an optimal value. In other words, the total power consumption $P_{total}$ may be the variable which each extremum-seeking controller 720 and 772 seeks to optimize.

Vapor Compression System

Referring now to FIG. 13, a vapor compression air conditioning system 1300 is shown, according to some embodiments. System 1300 is shown to include a refrigerant circuit 1310. Refrigerant circuit 1310 includes a condenser 1312, an evaporator 1314, an expansion valve 1324, and a compressor 1306. Compressor 1306 is configured to circulate a refrigerant between evaporator 1314 and condenser 1312. Refrigerant circuit 1310 operates using a vapor compression cycle. For example, compressor 1306 compresses the refrigerant to a hot, high pressure state. The compressed refrigerant flows through condenser 1312 where the refrigerant rejects heat. A condenser fan 1322 can be used to modulate the rate of heat transfer within condenser 1312. The cooled refrigerant is expanded by expansion valve 1324 to a low pressure, low temperature state. The expanded refrigerant flows through evaporator 1314 where the refrigerant absorbs heat. An evaporator fan 1316 can be used to modulate the rate of heat transfer within evaporator 1314.

In some embodiments, refrigerant circuit 1310 is located within a rooftop unit 1302 (e.g., a rooftop air handling unit) as shown in FIG. 13. Rooftop unit 1302 can be configured to provide cooling for supply air 1320 flowing through an air duct 1322. For example, evaporator 1314 can be located within air duct 1322 such that supply air 1320 flows through evaporator 1314 and is cooled by transferring heat to the expanded refrigerant within evaporator 1314. The cooled airflow can then be routed to a building to provide cooling for a room or zone of the building. The temperature of supply air 1320 can be measured by a temperature sensor 1318 located downstream of evaporator 1314 (e.g., within duct 1322). In other embodiments, refrigerant circuit 1310 can be used in any of a variety of other systems or devices that transfer heat using a vapor compression cycle (e.g., chillers, heat pumps, heat recovery chillers, refrigeration devices, etc.).

Extremum seeking controller 720 is shown receiving a power input $P_1$ representing the total power consumed by compressor 1306 $P_{comp}$, evaporator fan 1316 $P_{fan,evap}$, and condenser fan 1322 $P_{fan,cond}$ (i.e., $P_1 = P_{comp} + P_{fan,evap} + P_{fan,cond}$). As illustrated in FIG. 13, the power inputs $P_{comp}$, $P_{fan,evap}$, and $P_{fan,cond}$ can be summed outside of extremum seeking controller 720 at summing block 1308 to provide a combined signal representative of the system power $P_1$. In other embodiments, extremum seeking controller 720 receives the individual power inputs $P_{comp}$, $P_{fan,evap}$, and $P_{fan,cond}$ and conducts the summation of summing block 1308. In either case, extremum seeking controller 720 can be said to receive the power inputs $P_{comp}$, $P_{fan,evap}$, and $P_{fan,cond}$ even if the power inputs are provided as a single summed or combined signal $P_1$ representing the system power.

The system power $P_1$ can include the power consumption of one or more components of vapor compression system 1300. In the embodiment shown in FIG. 13, the system power $P_1$ includes $P_{comp}$, $P_{fan,evap}$, and $P_{fan,cond}$. However, in various other embodiments, the system power $P_1$ can include any combination of power inputs. For example, the system power $P_1$ can include the power consumption of various other fans within rooftop unit 1302, the power consumption of a fluid pump, and/or any other power consumption that occurs within vapor compression system 1300.

Extremum seeking controller 720 is shown providing a temperature setpoint $T_{sp}$ to a feedback controller 1304. In some embodiments, the temperature setpoint $T_{sp}$ is the manipulated variable which extremum seeking controller 720 adjusts to affect the system power $P_1$. The temperature setpoint $T_{sp}$ is a setpoint for the temperature of the supply air 1320 leaving evaporator 1314. The supply air temperature $T_{sa}$ can be measured by temperature sensor 1318 located downstream of evaporator 1314. Feedback controller 1304 is shown receiving the supply air temperature $T_{sa}$ as a feedback signal.

Feedback controller 1304 can operate evaporator fan 1316, condenser fan 1322, and/or compressor 1306 to achieve the temperature setpoint $T_{sp}$ provided by extremum seeking controller 720. For example, feedback controller 1304 can increase the speed of evaporator fan 1316 to increase the amount of heat removed from the supply air 1320 in evaporator 1314 or decrease the speed of evaporator fan 1316 to decrease the amount of heat removed from the supply air 1320 in evaporator 1314. Similarly, feedback controller 1304 can increase the speed of condenser fan 1322 to increase the amount of heat removed from the refrigerant in condenser 1312 or decrease the speed of condenser fan 1322 to decrease the amount of heat removed from the refrigerant in condenser 1312.

Extremum seeking controller 720 implements an extremum seeking control strategy that dynamically searches for an unknown input (e.g., optimal supply air temperature setpoint $T_{sp}$) to obtain system performance that trends near optimal. Although feedback controller 1304 and extremum seeking controller 720 are shown as separate devices, it is contemplated that feedback controller 1304 and extremum seeking controller 720 can be combined into a single device in some embodiments (e.g., a single controller that performs the functions of both extremum seeking controller 720 and feedback controller 1304). For example, extremum seeking controller 720 can be configured to control evaporator fan 1316, condenser fan 1322, and/or compressor 1306 directly without requiring an intermediate feedback controller 1304.

Still referring to FIG. 13, extremum-seeking controller 772 is shown to be connected to extremum-seeking controller 720 in order to share performance variable data. In some embodiments, extremum-seeking controller 772 is configured to control a second set of vapor compression equipment (e.g., another rooftop unit) and provides control input(s) to that equipment. Extremum-seeking controller 772 can be configured to monitor the power consumption $P_2$ of the second rooftop unit. Extremum-seeking controller 720 can be configured to send the power consumption $P_1$ to extremum-seeking controller 772. Similarly, extremum-seeking controller 772 can be configured to send the power consumption $P_2$ to extremum-seeking controller 720. Each extremum-seeking controller 720 and 772 can be configured to calculate a total performance variable based on the power consumption values. In this case, the total performance variable is the combined power consumption of equipment controlled by extremum-seeking controllers 720 and 772 (i.e., $P_{total}=P_1+P_2$). It should be noted that this ESC system can include any amount of additional extremum-seeking controllers operating on separate but interacting equipment.

Each extremum-seeking controller 720 and 772 can be configured to independently optimize the total power consumption $P_{total}$ by adjusting the control inputs provided by that controller. For example, extremum-seeking controller 720 can modulate the temperature setpoint $T_{sp}$ to drive the total power consumption $P_{total}$ to an optimal value. In other words, the total power consumption $P_{total}$ may be the variable which each extremum-seeking controller 720 and 772 seeks to optimize.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A cooperative extremum-seeking control system comprising:
 a first extremum-seeking controller configured to provide a first control input to a first plant and receive a first performance variable as feedback from the first plant; and
 a second extremum-seeking controller configured to provide a second control input to a second plant that mutually interacts with the first plant, receive a second performance variable as feedback from the second plant, and provide the second performance variable to the first controller;
 wherein the first extremum-seeking controller is further configured to aggregate the first performance variable and the second performance variable to determine a total performance variable, calculate a gradient of the total performance variable with respect to the first control input, generate a third control input using the gradient of the total performance variable, and provide the third control input to the first plant, wherein the first plant uses the third control input to operate equipment of the first plant, thereby affecting a variable state or condition of the first plant.

2. The system of claim 1, wherein the total performance variable indicates total power consumption of the first plant and the second plant.

3. The system of claim 1, wherein the third control input is a temperature setpoint, a pressure setpoint, a speed setpoint, a damper position, or a valve position.

4. The system of claim 1, wherein the first performance variable indicates power consumption, temperature, pressure, flow, humidity, air quality, damper position, coefficient of performance, comfort, or valve position.

5. The system of claim 1, wherein the first extremum-seeking controller is configured to drive the gradient of the total performance variable with respect to the first control input to zero in order to generate the third control input.

6. The system of claim 1, wherein the first plant is an air handling unit (AHU), a chilled water plant, a variable refrigerant flow (VRF) system, or a vapor compression system.

7. The system of claim 1, wherein the first extremum-seeking controller is configured to filter disturbances from the first performance variable.

8. A cooperative extremum-seeking control method comprising:
providing a first control input to a first control system;
receiving a first performance variable as feedback from the first control system;
receiving a second performance variable from a second control system that mutually interacts with the first control system;
aggregating the first performance variable and the second performance variable to determine a total performance variable;
calculating a gradient of the total performance variable with respect to the first control input;
generating a second control input using the gradient of the total performance variable;
providing the second control input to the first control system; and
using the second control input to operate equipment of the first control system, thereby affecting a variable state or condition of the first control system.

9. The method of claim 8, wherein the total performance variable indicates total power consumption of the first control system and the second control system.

10. The method of claim 8, wherein the second control input is a temperature setpoint, a pressure setpoint, a speed setpoint, a damper position, or a valve position.

11. The method of claim 8, wherein the first performance variable indicates power consumption, temperature, pressure, flow, humidity, air quality, damper position, coefficient of performance, comfort, or valve position.

12. The method of claim 8, wherein generating the second control input using the gradient of the total performance variable comprises driving the gradient of the total performance variable with respect to the first control input to zero.

13. The method of claim 8, wherein the first control system is an air handling unit (AHU), a chilled water plant, a variable refrigerant flow (VRF) system, or a vapor compression system.

14. The method of claim 8, further comprising filtering disturbances from the first performance variable.

15. An extremum-seeking controller configured to:
provide a first control input to a first control system;
receive a first performance variable as feedback from the first control system;
receive a second performance variable from a second control system that mutually interacts with the first control system;
aggregate the first performance variable and the second performance variable to determine a total performance variable;
calculate a gradient of the total performance variable with respect to the first control input;
generate a second control input using the gradient of the total performance variable; and
provide the second control input to the first control system, wherein the first control system uses the second control input to operate equipment of the first control system, thereby affecting a variable state or condition of the first control system.

16. The controller of claim 15, wherein the total performance variable indicates total power consumption of the first control system and the second control system.

17. The controller of claim 15, wherein the second control input is a temperature setpoint, a pressure setpoint, a speed setpoint, a damper position, or a valve position.

18. The controller of claim 15, wherein the first performance variable indicates power consumption, temperature, pressure, flow, humidity, air quality, damper position, coefficient of performance, comfort, or valve position.

19. The controller of claim 15, further configured to drive the gradient of the total performance variable with respect to the first control input to zero in order to generate the second control input.

20. The controller of claim 15, wherein the first control system is an air handling unit (AHU), a chilled water plant, a variable refrigerant flow (VRF) system, or a vapor compression system.

* * * * *